United States Patent [19]

Abukawa

[11] Patent Number: 5,385,423
[45] Date of Patent: Jan. 31, 1995

[54] JOINT FOR CORRUGATED STRUCTURAL MEMBERS

[75] Inventor: Sakio Abukawa, Oodate, Japan

[73] Assignee: Toko Tekko Kabushiki Kaisha, Japan

[21] Appl. No.: 11,999

[22] Filed: Feb. 1, 1993

Related U.S. Application Data

[62] Division of Ser. No. 664,557, Mar. 4, 1991, Pat. No. 5,233,799.

[30] Foreign Application Priority Data

| Apr. 9, 1990 | [JP] | Japan | 2-37834 |
| Apr. 13, 1990 | [JP] | Japan | 2-39916 |
| Oct. 29, 1990 | [JP] | Japan | 2-113691 |

[51] Int. Cl.[6] .................. F16B 1/00; E04B 1/32
[52] U.S. Cl. .................. 403/245; 403/186; 403/363; 403/187; 52/86
[58] Field of Search .................. 403/265, 270–272, 403/230, 167, 168, 186–187, 245, 189, 262, 363, 335–337, 13–14, 241; 52/64–67, 53, 47, 86, 87, 293.3, 57, 708

[56] References Cited

U.S. PATENT DOCUMENTS

| 2,019,707 | 11/1935 | Jenkins | 52/293.3 X |
| 2,047,436 | 7/1936 | Shepherd | 256/13.1 |
| 2,073,185 | 3/1937 | Shafer | 52/293.3 |
| 2,100,209 | 11/1937 | Bleuel | 403/189 |
| 2,146,333 | 2/1939 | Deming | 403/271 X |
| 2,574,074 | 11/1951 | Vogel | 52/293.3 X |
| 3,989,399 | 11/1976 | Slowbe | 403/245 |
| 3,999,875 | 12/1976 | Simon | 403/230 X |
| 4,068,438 | 1/1978 | Nute, Jr. | 403/245 X |
| 4,069,638 | 1/1978 | Hasselqvist | 403/363 X |
| 5,233,799 | 8/1993 | Abukawa | 52/86 |

FOREIGN PATENT DOCUMENTS

| 665645 | 9/1938 | Germany | 403/230 |
| 359532 | 2/1962 | Switzerland | 52/86 |

Primary Examiner—Randolph A. Reese
Assistant Examiner—Harry C. Kim
Attorney, Agent, or Firm—Bruce L. Adams; Van C. Wilks

[57] ABSTRACT

A joint assembly for an arched building structure comprises a non-corrugated flat plate member and at least one corrugated plate member connected to and extending outwardly of the non-corrugated plate member. The corrugated plate member has proximal and distal ends with corrugations extending therebetween and the proximal end abuts the non-corrugated plate member. The corrugations extend in side-by-side relation in a straight line with the line extending in the lengthwise direction of the non-corrugated plate member. The corrugations may have a trapezoidal cross section though corrugations having other shapes may be used.

9 Claims, 23 Drawing Sheets

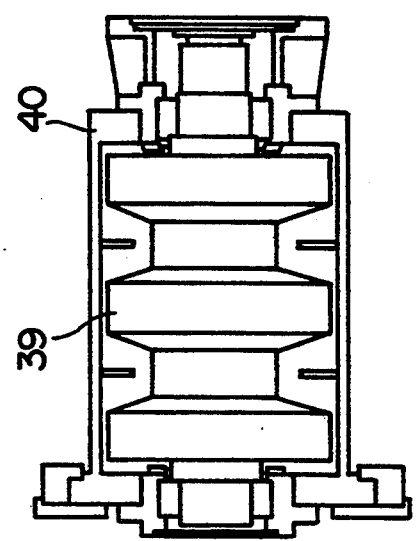
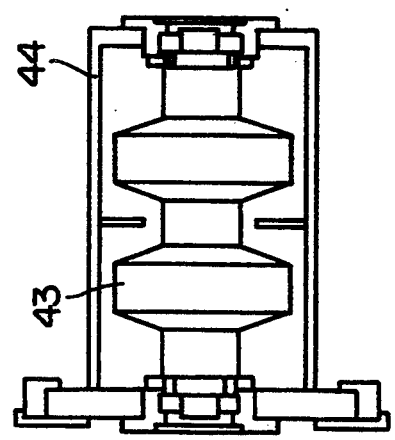

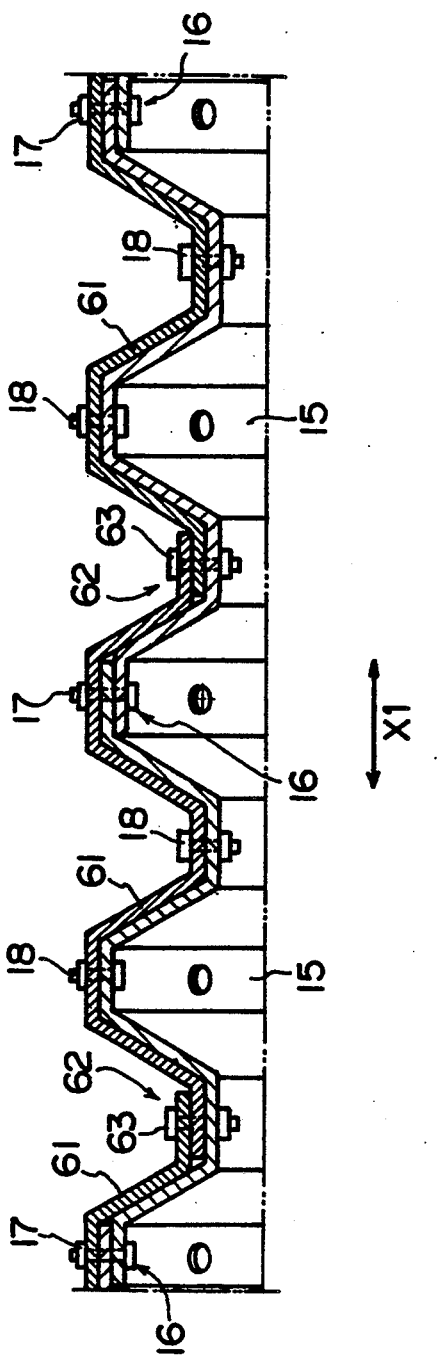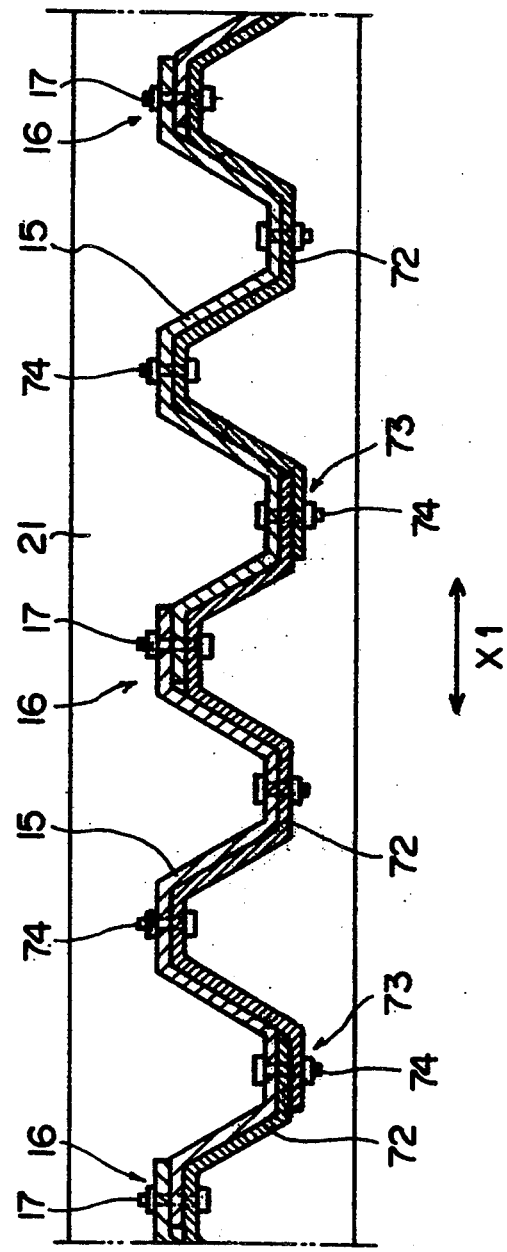

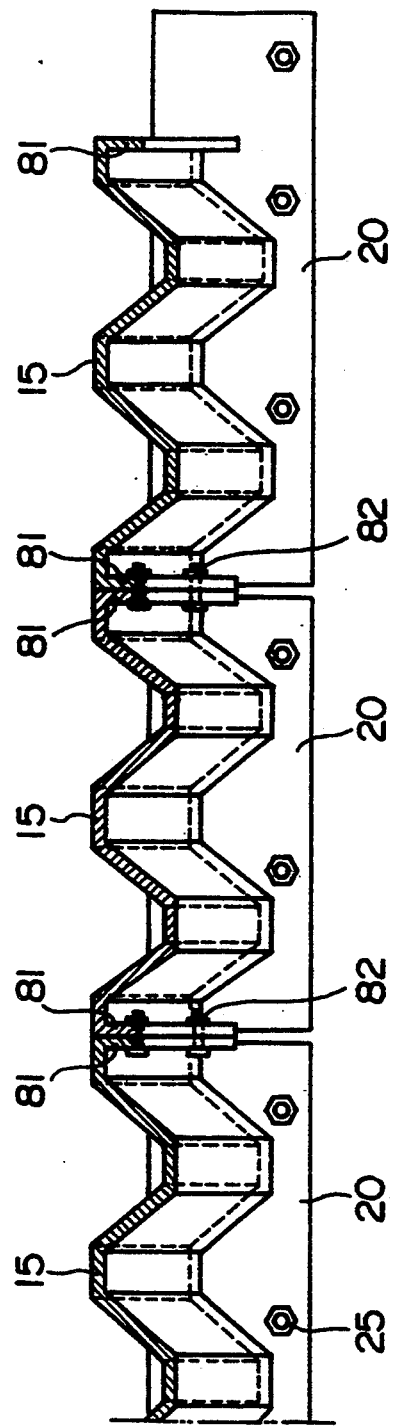
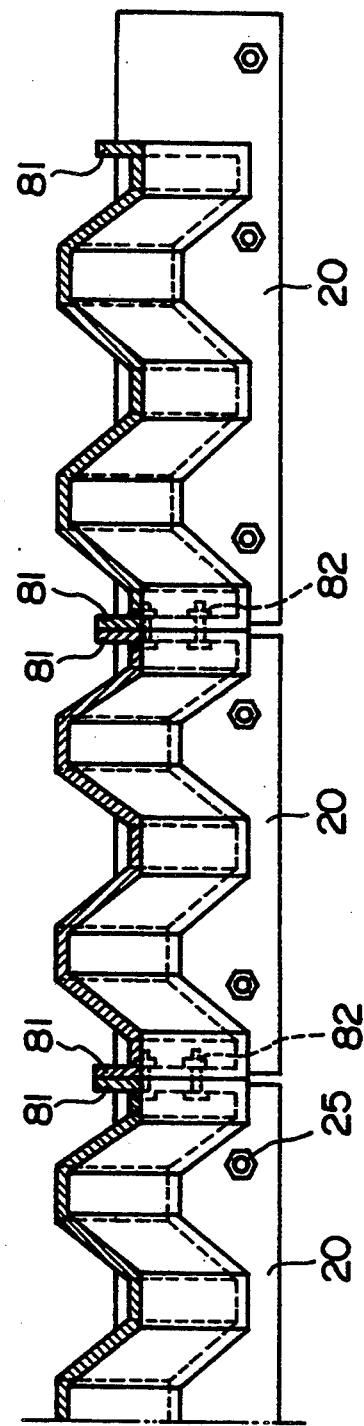

JOINT FOR CORRUGATED STRUCTURAL MEMBERS

This is a division of application Ser. No. 664,557 filed Mar. 4, 1991, U.S. Pat. No. 5,233,799.

BACKGROUND OF THE INVENTION

1. Field of the Invention

The present invention relates to an arched building structure.

2. Description of the Related Art

Recently, arched building structures having an arched or curved form have been used in various applications and purposes. For instance, to prevent snow from lying on the roads, grounds and the like in snowfall areas, arched building structures are used as snow shelters. Arched building structures are also used as shock absorbing shelters to moderate wind pressure at the exit of a tunnel in a railway network.

Such arched building structures should have a sufficient mechanical strength to withstand the weight of snow and wind pressure.

To provide such a mechanical strength, a conventional arched building structures has a frame made of steel or the like and iron plates, such as tin plates, attached to the steel frame. Although this structure can have the required mechanical strength, it increases the construction steps as well as construction cost.

SUMMARY OF THE INVENTION

It is therefore an object of the present invention to provide an arched building structure which has a sufficient mechanical strength and can be built easily at low cost.

(1) To achieve this object, an arched building structure according to one aspect of the present invention comprises multiple curved structural members constituted by a corrugated plate bent perpendicular to the wave direction and having a large section modulus, and curved-member coupling means, formed separate from the multiple curved members, for coupling the multiple curved members along the length of the corrugated plate to provide an arched coupling body.

Since this structure uses a corrugated plate with a large section modulus as a structural member, it can sufficiently resist the weight of snow and wind pressure.

Also because the arched building structure can be realized by a combination of the corrugated plates, the structure can be built easily at low cost.

Further, as the curved-member coupling means is formed separate from the curved members, this coupling means can be carried or transported separate from the curved members, thus improving the efficiency of transporting the curved members.

(2) According to another aspect of the present invention, an arched building structure comprises multiple curved members constituted by coupling multiple corrugated plates, each bent perpendicular to the wave direction and having a large section modulus, by flanges provided on wave-directional ends of the corrugated plates, and curved-member coupling means for coupling the multiple curved members in a lengthwise direction of the corrugated plates to provide an arched coupling body.

With this structure, because of the reason given in the section (1) above, an arched building structure has a sufficient mechanical strength and can be built easily and at low cost.

Since the corrugated plates will be coupled by the flange provided at the end portion of the corrugated plate, the coupling job can be done on either the outer or inner surface of the curved member. This can simplify the work of coupling the corrugated plates.

(3) According to a different aspect of the present invention, an arched building structure comprises multiple curved members constituted by a corrugated plate bent perpendicular to the wave direction and having a large section modulus, curved-member coupling means for coupling the multiple curved members along the length of the corrugated plate to provide an arched coupling body, and support means, formed separate from the arched coupling body, for supporting the arched coupling body in such a way that the arched coupling body is secured on the ground.

With this structure, because of the reason given in the section (1) above, an arched building structure has a sufficient mechanical strength and can be built easily and at low cost.

In addition, as the support means is formed separate from the curved members, the transporting efficiency of the curved members can be enhanced.

(4) According to a further aspect of the present invention, an arched building structure comprises multiple curved members constituted by a corrugated plate bent perpendicular to the wave direction and having a large section modulus, curved-member coupling means for coupling the multiple curved members along the length of the corrugated plate to provide an arched coupling body, and support means for supporting the arched coupling body movable on the ground.

With this structure, because of the reason given in the section (1) above, an arched building structure has a sufficient mechanical strength and can be built easily and at low cost.

Due to the above structural features, the arched building structure is movable, so that outdoor work, such as a painting job, can be done even when it rains or snows.

(5) According to a still further aspect of the present invention, an arched building structure comprises multiple arched coupling bodies each formed by coupling multiple curved members constituted by a corrugated plate bent perpendicular to the wave direction and having a large section modulus along the length of the corrugated plate, and support means for supporting the multiple arched coupling bodies on the ground in such a manner that mutual positions thereof are changeable.

With this structure, because of the reason given in the section (1) above, an arched building structure has a sufficient mechanical strength and can be built easily and low cost.

Because of the reason given in the section (4), the arched building structure can ensure outdoor work, such as a painting job, even when it rains or snows.

In addition, the mutual positions of the multiple arched coupling bodies can be changed, so that the arched building structure can have a greater depth than the structure described in the section (4). Furthermore, this depth can be freely changed.

(6) According to another aspect of the present invention, a joint comprises a first plate member, and a second plate member provided integral with the first plate member, standing upright on the first plate member, and having a wave cross section.

This structure can provide a coupling joint suitable for curved-member coupling means and support means, which is formed separated from the curved members.

BRIEF DESCRIPTION OF THE DRAWINGS

FIG. 11 is a plan view of the bending roll machine, taken along the line L5-L6 in FIG. 10 as viewed in the arrow direction;

FIG. 12 is a plan view of the bending roll machine, taken along the line L7-L8 in FIG. 10 as viewed in the arrow direction;

FIG. 23 is a cross section of the arched building structure taken along the line L1-L2 in FIG. 22, and as viewed in the arrow direction;

FIG. 24 is a cross section of the arched building structure taken along the line L11-L12 in FIG. 20, and as viewed in the arrow direction;

FIG. 26 is a cross section of the arched building structure taken along the line L13-L14 in FIG. 25, and as viewed in the arrow direction;

FIG. 27 is a cross section illustrating a modification of the fourth embodiment in the same manner as FIG. 26;

DETAILED DESCRIPTION OF THE PREFERRED EMBODIMENTS

Preferred embodiments of the present invention will now be described in detail referring to the accompanying drawings.

Figure 1:
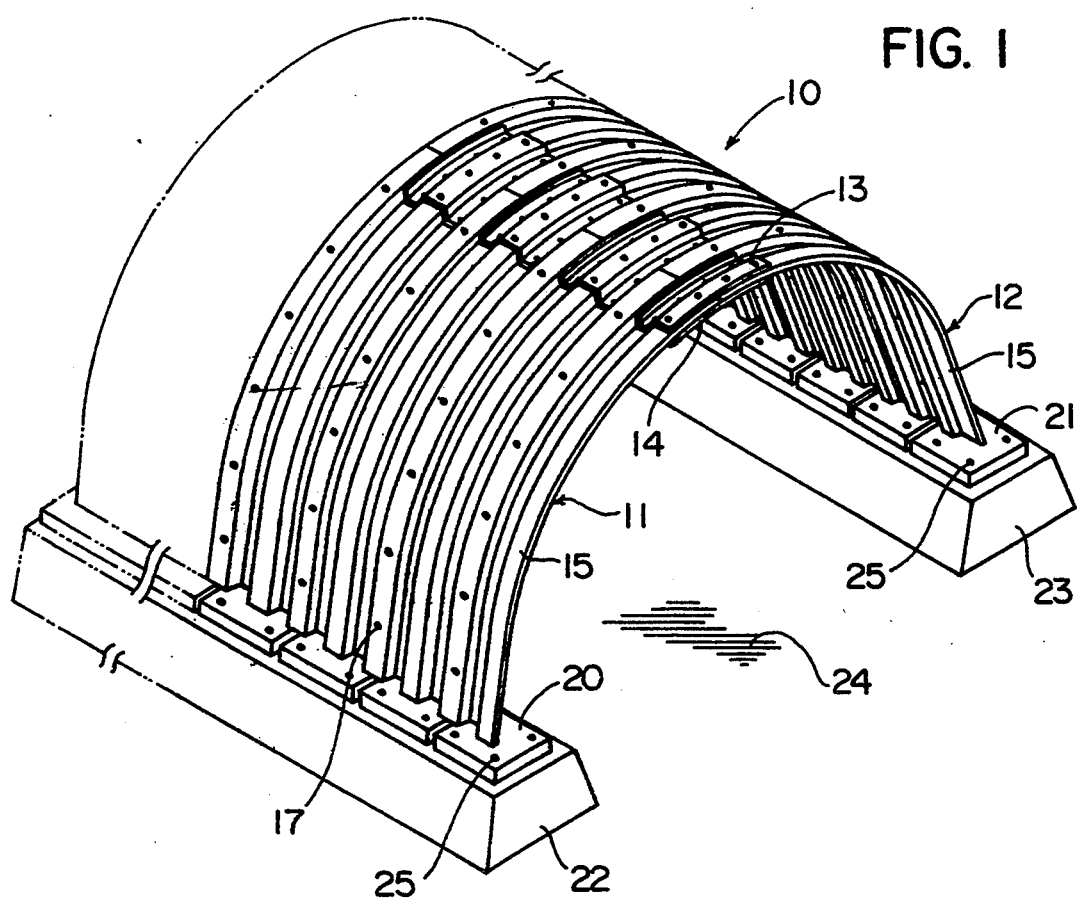
FIG. 1 is a perspective view illustrating the outline of an arched building structure according to a first embodiment of the present invention.
Figure 2:
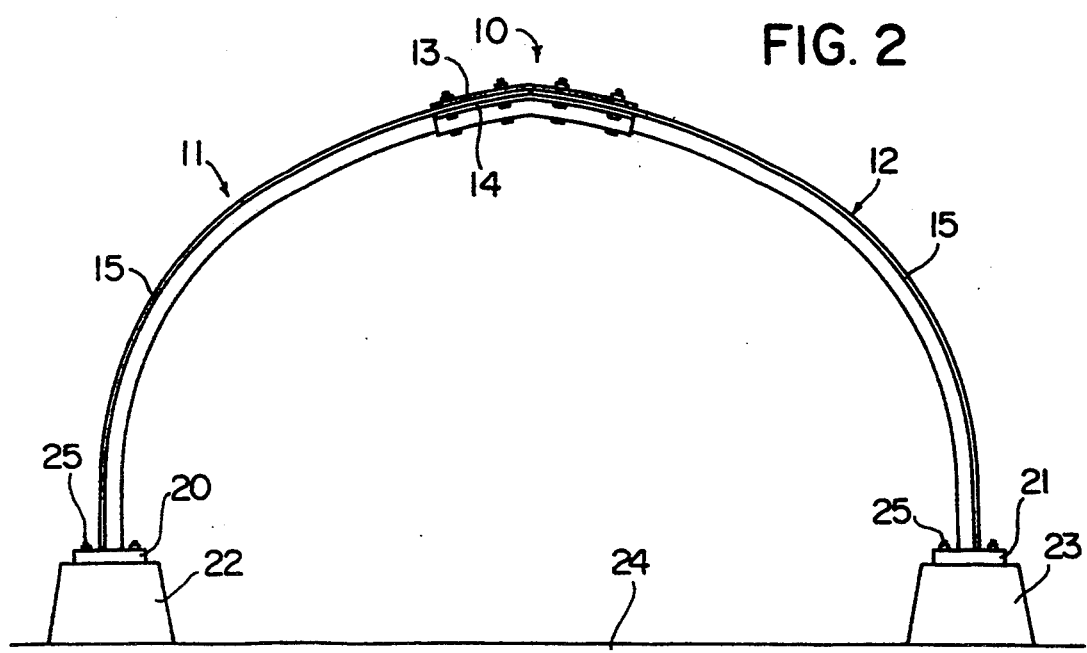
FIG. 2 is a front view illustrating the arched building structure of the first embodiment as viewed from the gable side.

FIG. 1 is a perspective view illustrating the outline of the arched building structure according to the first embodiment of the present invention, and FIG. 2 is a front view of the structure as viewed from the gable side.

In FIGS. 1 and 2, an arched coupling body 10 is secured on the ground 24 through still plates 20 and 21 and stills 22 and 23.

Two curved structural members 11 and 12 are coupled together in end-to-end axial alignment by plate members 13 and 14 to form the arched coupling body 10.

The curved members 11 and 12 are so designed that multiple large steel decks 15, bent perpendicular to the wave direction with some roundness, are coupled in parallel to the wave direction.

Figure 3:
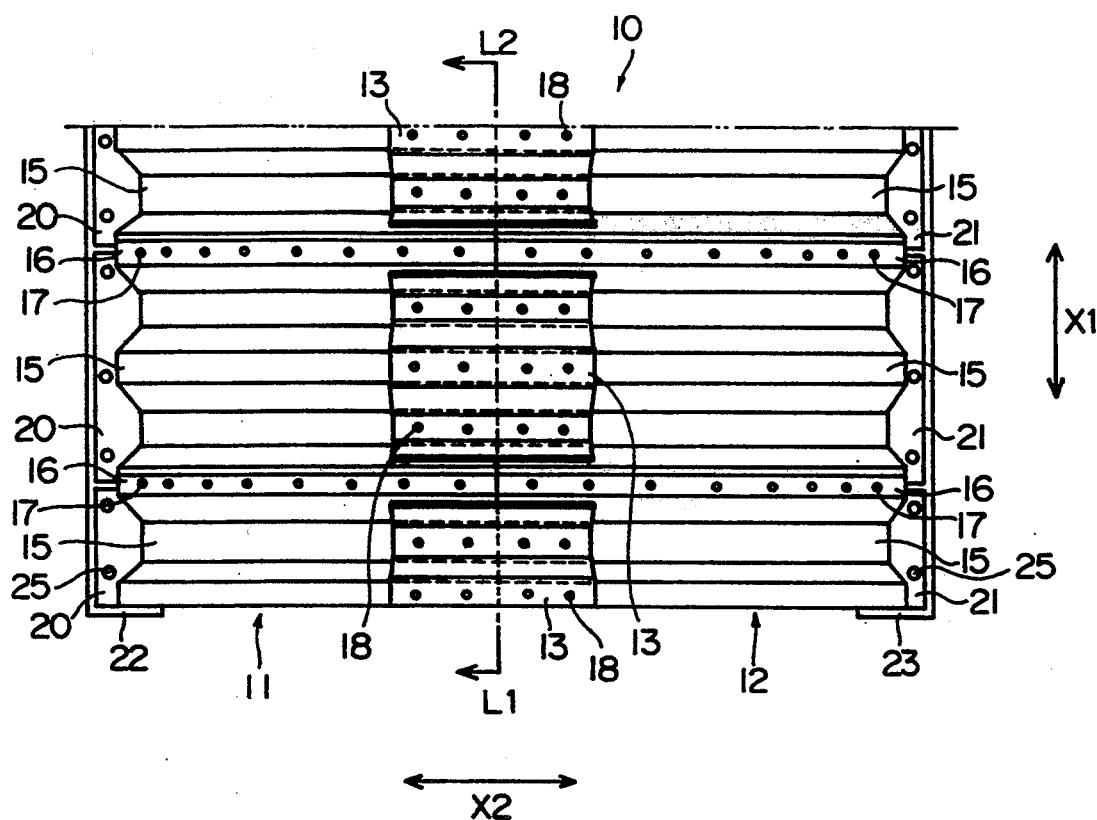
FIG. 3 is a top plan view illustrating the arched building structure of the first embodiment.

FIG. 3 is a top plan view of the arched coupling body 10.

Figure 4:
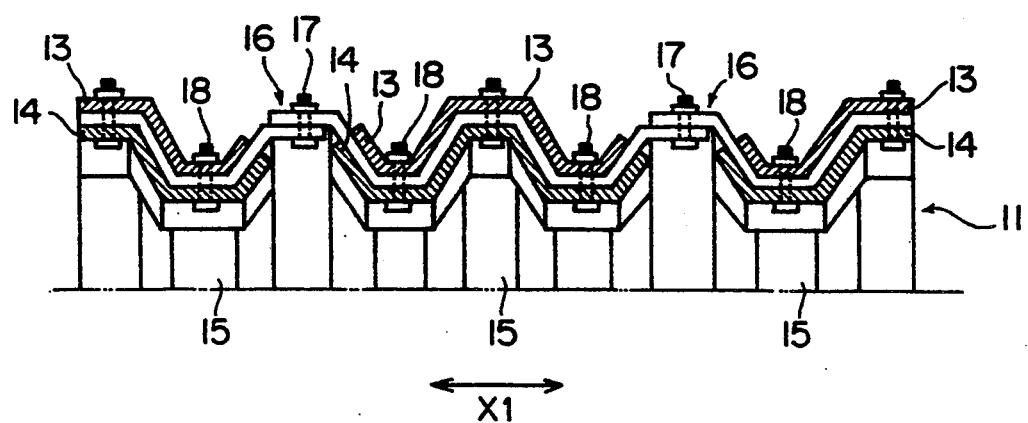
FIG. 4 is a cross section of the arched building structure taken along the line L1-L2 in FIG. 3, and as viewed in the arrow direction.

FIG. 4 is a cross section taken along the line L1–L2 (boundary between the curved members 11 and 12) in FIG. 3.

Figure 5:
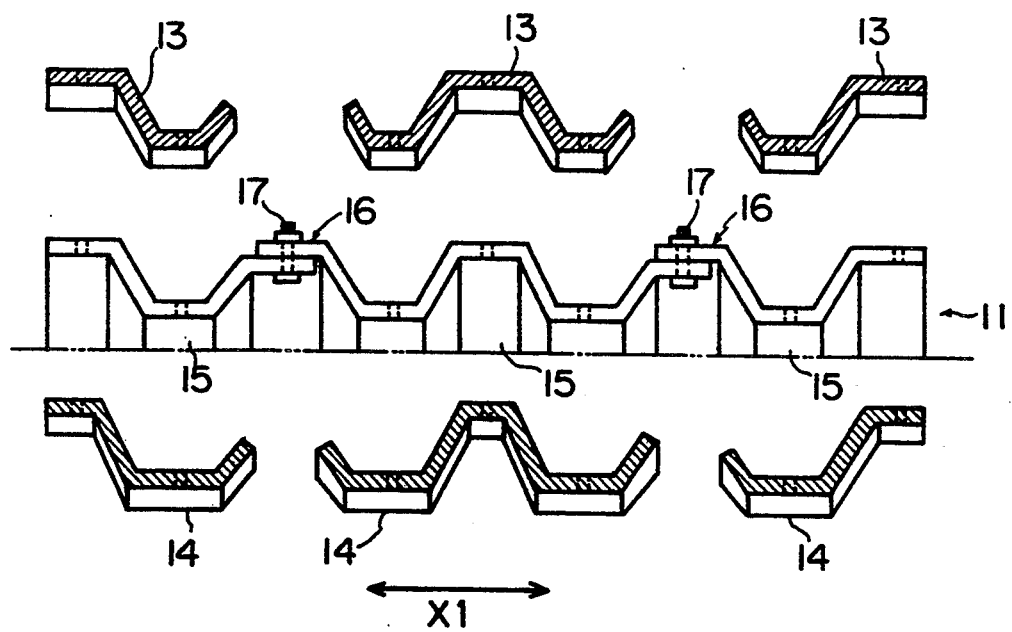
FIG. 5 is an exploded side view of the arched building structure shown in FIG. 4.

FIG. 5 is a cross section illustrating the plate members 13 and 14 separated in FIG. 4.

Figure 6:
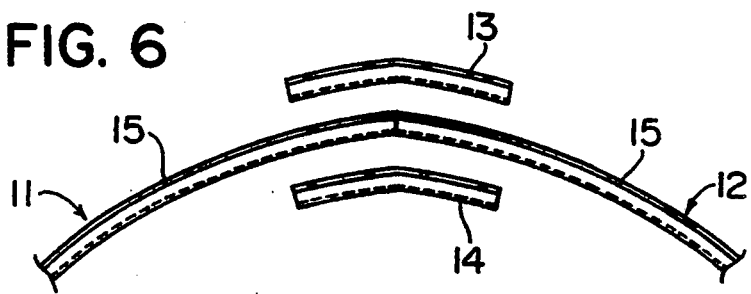
FIG. 6 is an partially exploded front view of the arched building structure shown in FIG. 2.

FIG. 6 is a front view illustrating the plate members 13 and 14 separated in FIG. 2.

In FIGS. 3 through 5, X1 indicates the wave direction of the large steel deck 15, and X2 the lengthwise direction thereof.

As shown in FIGS. 3–5, each two laterally adjoining large steel decks 15 in the respective curved members 11 and 12 are placed to overlap each other at their ends in the wave direction X1. At overlapping portions 16 originating from this arrangement, these large steel decks 15 are coupled together with fastening members 17 (hereafter simply referred to as "bolts"), such as bolts and nuts. Accordingly, the curved structural members 11 and 12 can have continuous mechanical strength in the wave direction X1.

The plate member 13 lies over the outer surfaces of the curved members 11 and 12, while the plate member 14 lies over the inner surfaces of the curved members 11 and 12, facing the plate member 13. With this structure, the two plate members 13 and 14 are fastened with, for example, bolts 18 through the curved members 11 and 12. The curved members 11 and 12 are therefore connected to each other while continuous mechanical strength is kept in the lengthwise direction of the large steel decks 15.

Multiple plate members 13 are provided in the wave direction X1, whose width is set smaller than the width of the wave direction X1 of the large steel deck 15. Since each plate member 13 is provided between the two adjoining overlapping portions 16, the member 13 is independently located in the wave direction X1. The plate member 14 is provided in a similar manner.

The plate members 13 and 14 are formed to have a trapezoidal-wave cross section to be fitted over the large steel decks 15. These plate members 13 and 14 can be obtained through a process of cutting and pressing the large steel deck 15, for example. The press work allows the plate members 13 and 14, when overlapping the associated large steel deck 15, to completely fit over the steel deck 15. In other words, the large steel deck 15 is also shaped to have a trapezoidal-wave cross section, and is very thick.

If the plate members 13 and 14 are prepared only by the work of cutting the large steel deck 15, therefore, the tops of the plate members 13 and 14, when placed over the steel deck 15, will not match with each other by the thickness of the large steel deck 15. The press work is therefore done to match the tops of both plate members each other.

Figure 7:
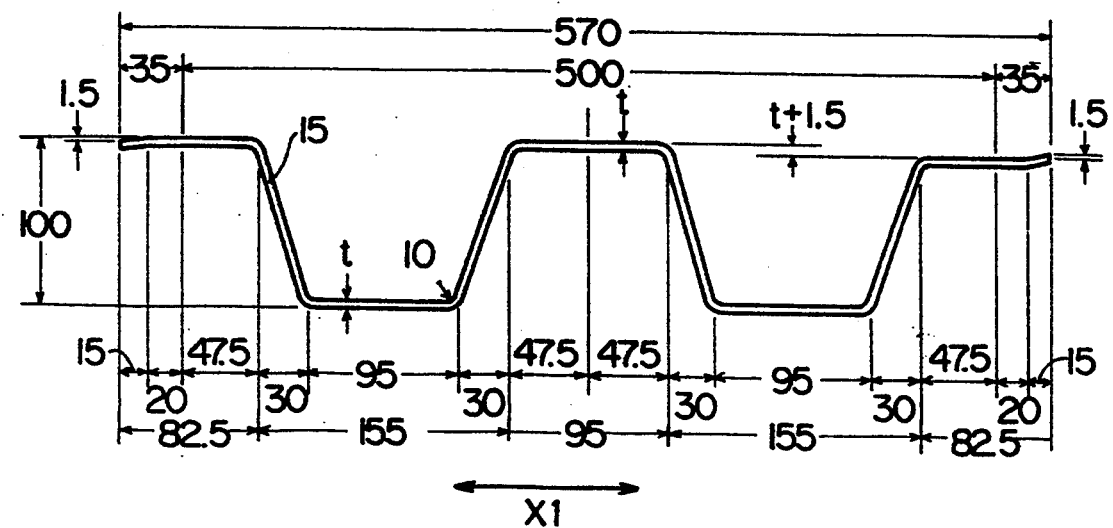
FIG. 7 is a side view for explaining the shape and size of a large steel deck.

FIG. 7 is a side view illustrating the shape of the large steel deck 15 and the sizes of individual portions of the deck. As illustrated, the large steel deck 15 has axially extending corrugations, a trapezoidal-wave cross section. The ends of the steel deck 15 terminate in marginal flange portions which constitute the overlapping portions 16. Although the individual corners of the trapezoidal wave are slightly rounded, this roundness is not shown in FIGS. 4 and 5 for diagrammatic simplicity.

The same is applied to the other diagrams which will be referred to later.

The height of the peak of the large steel deck 15 is set to 100 mm. At present, there are five values set for the thickness of the steel deck 15 within a range from 2.7 mm to 6.0 mm. The width of the steel deck 15 in wave direction X1 is set to 570 mm. Of the 570-mm width, a 70-mm portion, for example, is assigned for the overlapping portion 16. In this case, therefore, the effective width of the wave direction X1 of the large steel deck 15 is 500 mm.

The above-described size is specified in the Japanese Industrial Standards (JIS).

The still plates 20 and 21 are disposed at the ends on the ground side. As shown in FIG. 3, the still plates 20 and 21 are integrally fixed to corresponding large steel decks 15 by welding, for example. The stills 22 and 23 are made by placing concrete into the ground 24. With this structure, the still plates 20 and 21 are fastened to the respective stills 22 and 23 with bolts 25, for example. The arched coupling body 10 is securely supported on the ground 24 with the still plates 20 and 21, and the stills 22 and 23.

The arched building structure of this embodiment is designed as described above.

A bending roll machine to bend the large steel deck 15 with roundness will be explained below.

The large steel deck 15 available on the market is straight in shape, because the large steel deck 15 is generally used as a molding box to place concrete for a footbridge, for example.

For this purpose, the large steel deck has a significantly large section modulus. The ordinary bending roll machine to bend steel plates with roundness cannot therefore bend the large steel deck 15 with roundness.

Figure 8:
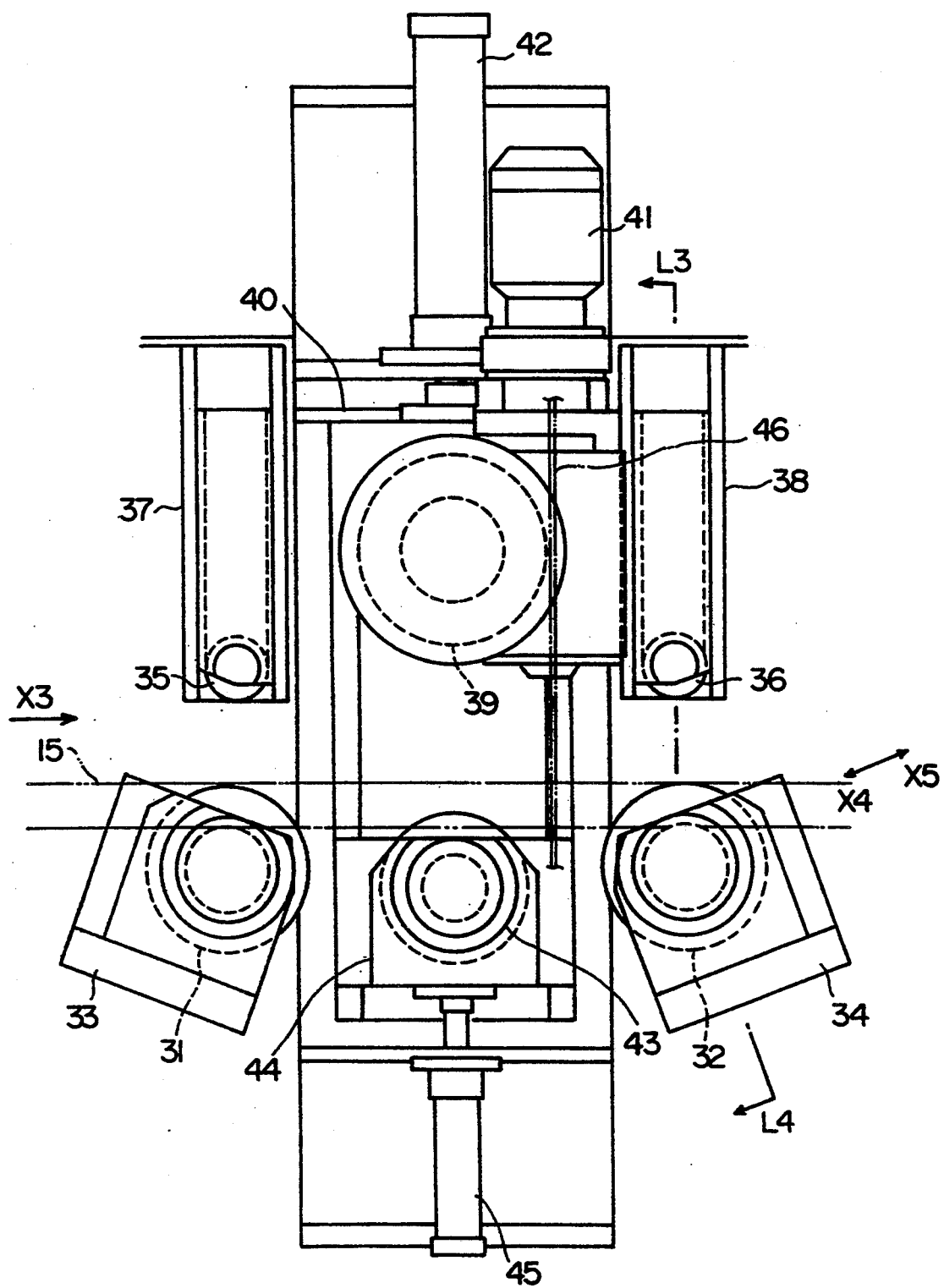
FIG. 8 is a front view of a bending roll machine.

In this respect, the present applicant has manufactured a bending roll machine as shown in FIG. 8. This bending roll machine is disclosed in Japanese Utility Model Application No. Hei 1-24152.

FIG. 8 illustrates the bending roll machine as viewed from the front. Referring to this diagram, reference numerals 31 and 32 denote rollers on which the large steel deck 15 is placed. The rollers 31 and 32 are supported rotatably on frames 33 and 34, with a predetermined distance separated horizontally from each other.

Rollers 35 and 36 together with the rollers 31 and 32 hold the large steel deck 15 placed on the rollers 31 and 32. The rollers 35 and 36 are respectively attached rotatably to the pistons of hydraulic cylinder mechanisms 37 and 38, and are movable up and down in accordance with the up-and-down movement of the pistons.

A roller 39 serves to convey the large steel deck 15 as well as curve it. This roller 39 is supported rotatably to a frame 40 between the rollers 31 and 32. The roller 39 is driven by a motor 41.

The frame 40 is attached to the piston of a hydraulic cylinder mechanism 42 to be movable up and down according to the up-and-down movement of this piston.

A roller 43 conveys the large steel deck 15 while holding the deck 15 with the roller 39. The roller 43 is supported rotatably to a frame 44 between the rollers 31 and 32.

The frame 44 is attached to the piston of a hydraulic cylinder mechanism 45 to be movable up and down according to the up-and-down movement of this piston.

The up-and-down movement of the piston of the hydraulic cylinder mechanism 45 is synchronized with the up-and-down movement of the piston of the hydraulic cylinder mechanism 42.

Reference numeral 46 denotes a scale for detecting the vertical position of the roller 39.

Figure 9:
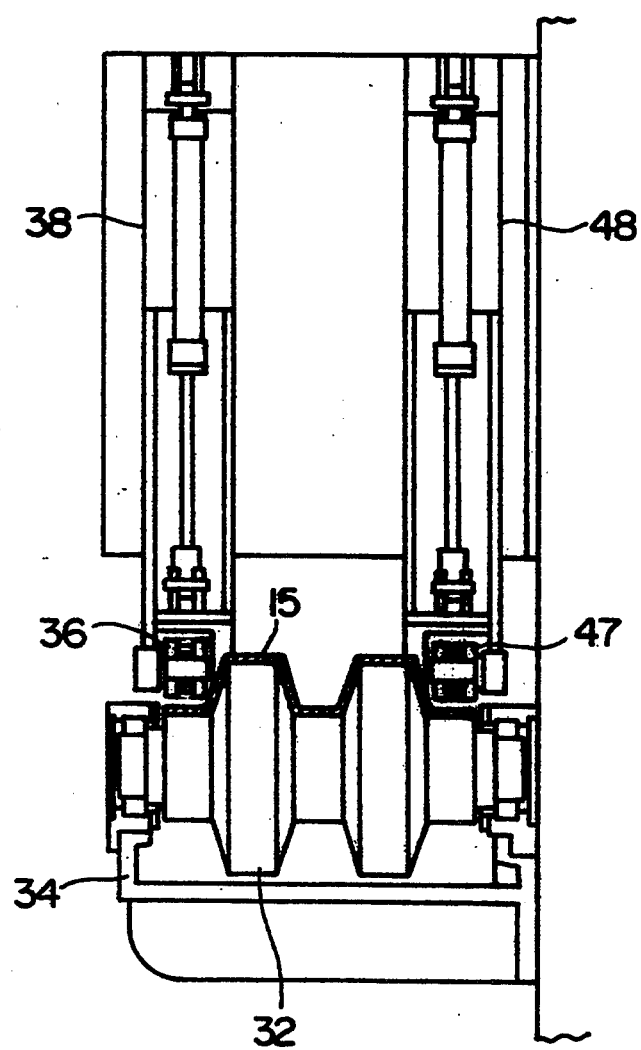
FIG. 9 is a side view of the bending roll machine, taken along the line L3-L4 in FIG. 8 as viewed in the arrow direction.

FIG. 9 is a side view of the bending roll machine long the line L3–L4 in FIG. 8 as viewed from the direction of the arrow. FIG. 9 illustrates the roller 36 having moved downward and holding the large steel deck 15 with the roller 32.

As illustrated, the roller 32 has an outer shape which will fit in the trapezoidal-wave shape of the large steel deck 15, while the roller 36 has a size to fit in one groove of the trapezoidal-wave shape.

Referring to FIG. 9, a roller 47 has the same function as the roller 36. The roller 47 is attached rotatably to the piston of a hydraulic cylinder mechanism 48, and moves up and down in accordance with the up-and-down movement of this piston.

The structure on the side of the rollers 31 and 35 is the same as the structure on the side of the rollers 32 and 36, though the details will be omitted.

Figure 10:
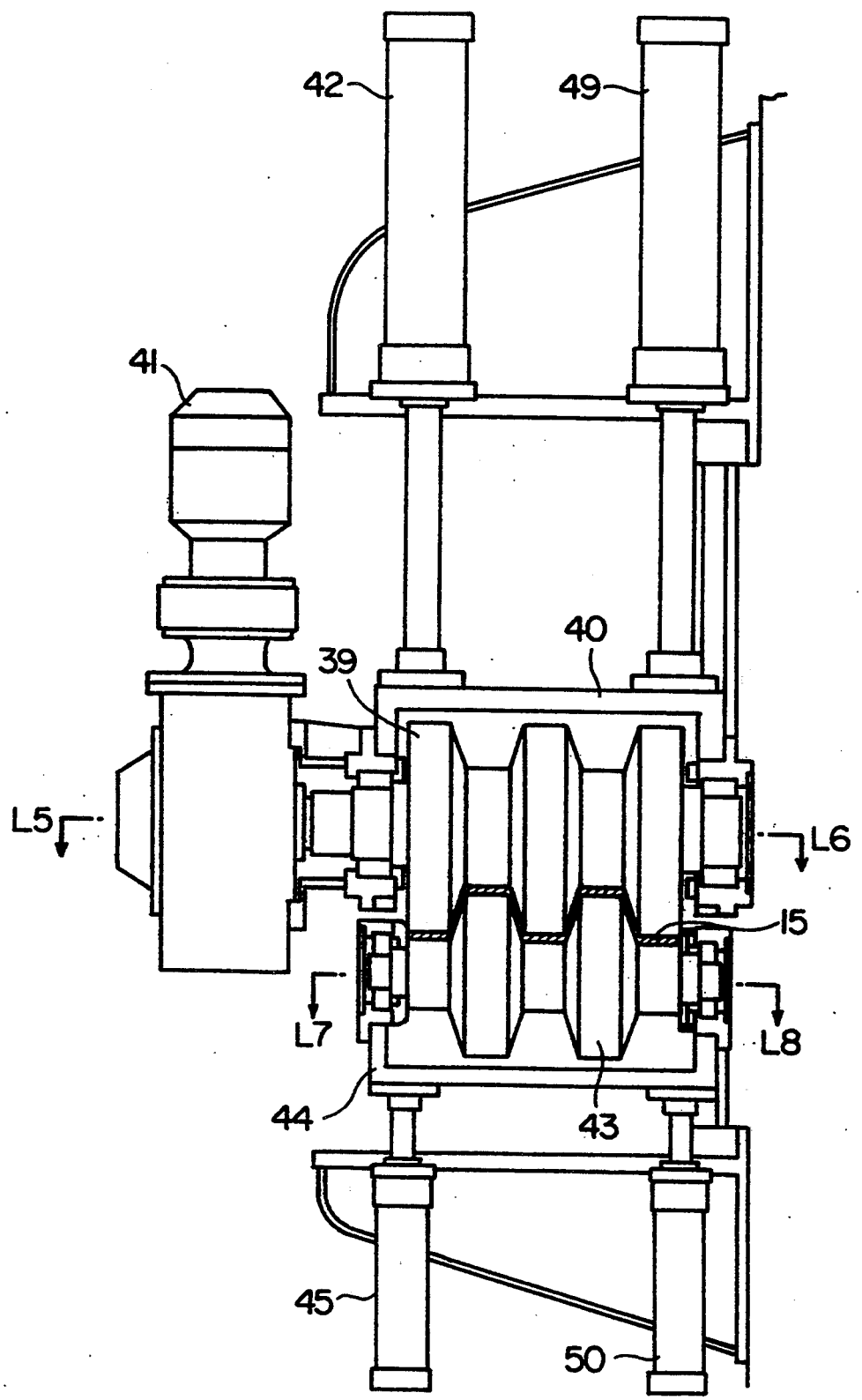
FIG. 10 is a partial side view illustrating the bending roll machine.

FIG. 10 is a side view showing rollers 39, 43, and the like.

FIG. 10 illustrates the roller 36 having moved downward.

As illustrated, the rollers 39 and 43 have an outer shape which will fit in the trapezoidal-wave shape of the large steel deck 15.

Reference numeral 49 is a hydraulic cylinder mechanism which, like the hydraulic cylinder mechanism 42, moves the roller 39 up and down.

Reference numeral 50 is a hydraulic cylinder mechanism which, like the hydraulic cylinder mechanism 45, moves the roller 43 up and down.

FIG. 11 is a top plan view taken along the line L5–L6 in FIG. 10, illustrating the roller 39 and the frame 40 supporting the roller 39.

Likewise, FIG. 12 is a top plan view taken along the line L7–L8 in FIG. 10, illustrating the roller 43 and the frame 44 supporting the roller 43.

The operation of the above-described structure will now be discussed.

First, the rollers 35, 36, 39 and 43 are positioned up as shown in FIG. 8.

In this state, the large steel deck 15 is inserted in the arrow direction X3, for example, and placed on the rollers 31 and 32.

Figure 13:
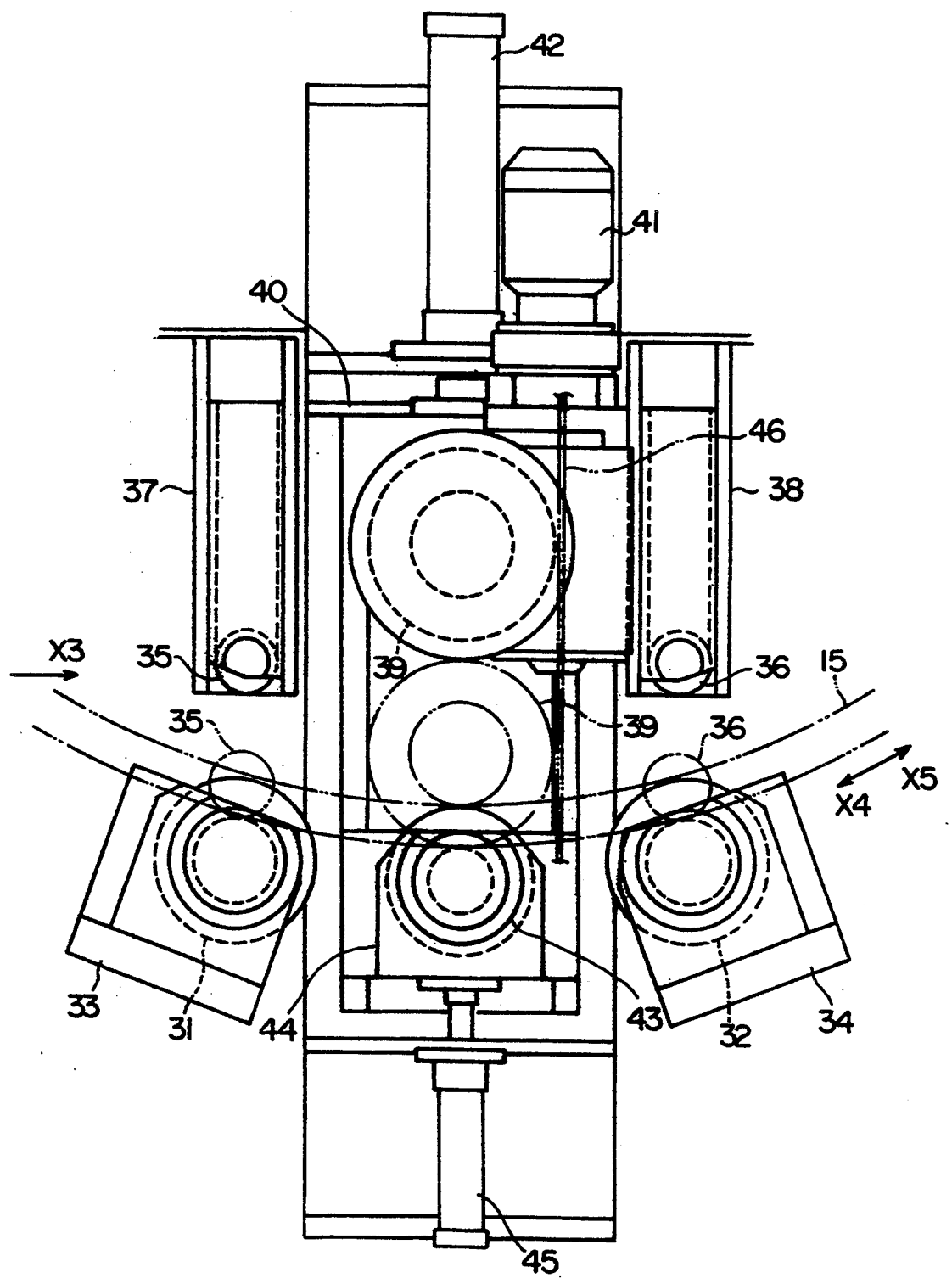
FIG. 13 is a front view for explaining the operation of the bending roll machine.

Then, the rollers 35 and 36 are moved downward as shown in FIG. 13, holding the large steel deck 15 together with the rollers 31 and 32.

The roller 39 is also moved downward to hold the steel deck 15 together with the roller 43.

The roller 39 is rotated by the motor 41, and is moved downward by the hydraulic cylinder mechanisms 42 and 49. In synchronism with this motion, the roller 43 is moved downward by the hydraulic cylinder mechanisms 45 and 50.

The large steel deck 15 is gradually curved, while alternately moving in the illustrated arrow directions X4 and X5.

In this case, the curvature of the large steel deck 15 is determined by the vertical positions of the rollers 39 and 43.

The vertical positions of the rollers 39 and 43 can be detected by the scale 46. Therefore, the desired curvature can be determined by setting the vertical positions of the rollers 39 and 43 while checking the scale 46.

The lengthwise curvature of each portion of the large steel deck 15 can be altered by changing the vertical positions of the rollers 39 and 43 while varying the center position of the large steel deck in motion (the center position of motion in the arrow directions X4 and X5). The results of experiments show that applying a load of about 210 kg/cm$^2$ to the large steel deck 15 can curve the deck 15.

The above is the structure and operation of the bending roll machine.

The above-described embodiment can provide an arched building structure having a large mechanical strength without using steel frames. This is because the arched building structure is constructed using the large steel deck 15 having a large section modulus.

According to this embodiment, an arched building structure can be constructed easily at a low cost since the arched building structure can be provided by simply coupling the large steel decks 15 bent with roundness.

Further, according to this embodiment, the transportation efficiency of the large steel decks 15 can be improved in the case where the arched coupling body 10 is transported, disassembled and is reassembled at the site. This is because the plate members 13 and 14 are formed separate from the large steel deck 15 so as to be detached therefrom.

The curved members 11 and 12 may be coupled by the method as disclosed in Japanese Utility Model Application No. Sho 63-133231, filed by the present applicant, which is to provide a coupling flange integrally on the end of the large steel deck 15 in the lengthwise direction X2.

According to this method, however, the movable load of the large steel deck 15 is determined by the size of the flange.

According to this embodiment, by way of contrast, the coupling plate members 13 and 14 are designed separable from the large steel deck 15, so that the movable load of the deck 15 is determined by the size of the deck 15. In other words, this embodiment can enhance the transporting efficiency of the large steel deck as compared with the flange system.

Further, two curved members 11 and 12 are held by the plate members 13 and 14 from both above and below, so than the mechanical strength for downward loads can be increased as compared with the flange system.

According to the flange system, in contrast, downward application of a load is likely to damage the coupling bolts under the flange, thus reducing the mechanical strength to this load.

Due to the same reason, according to this embodiment, the coupling strength of the curved members 11 and 12 can be increased although the plate members 13 and 14 are provided as separate in the wave direction X1.

According to this embodiment, since the plate members 13 and 14 are arranged not to lie over the overlapping portions 16 of the large steel deck 15, the number of the plate members 13 and 14 and the large steel deck 15 overlapping one another can be restricted to three at a maximum. This feature can ensure easy coupling of the plate members 13 and 14 to the large steel deck 15.

In addition, according to this embodiment, unlike the flange system, it is unnecessary to weld the flange to the large steel deck 15, thus increasing the efficiency of manufacturing parts.

Figure 14:
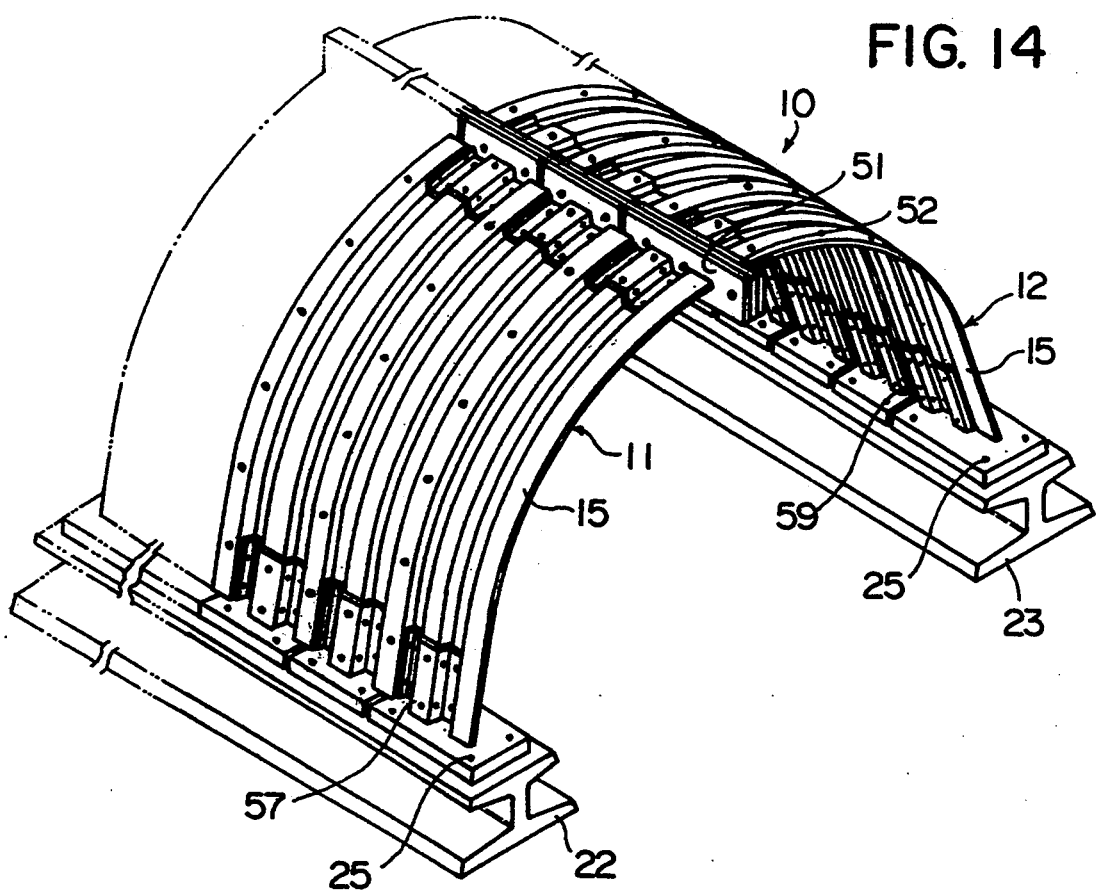
FIG. 14 is a perspective view illustrating the outline of an arched building structure according to a second embodiment of the present invention.

FIG. 14 is a perspective view showing the outline of an arched building structure according to the second embodiment of the present invention.

The same reference numerals as used to denote the individual portions in FIG. 1 are used to denote corresponding or identical portions in FIG. 14.

The second embodiment differs from the first embodiment in the coupling structure of the curved structural members 11 and 12 and the support structure of the arched coupling body 10.

To begin with, the coupling structure of the curved members 11 and 12 will be described below.

According to this embodiment, the curved members 11 and 12 are also connected in end-to-end axial alignment by coupling means formed separate from the members 11 and 12.

The foregoing description of the first embodiment has been given with reference to the curved members 11 and 12 being coupled by plate members 13 and 14 which are arranged extending over the curved members 11 and 12. In contrast, according to the second embodiment, the curved members 11 and 12 are coupled by a joint assembly comprised of two coupling members or joints 51 and 52 which are secured independently to the curved members 11 and 12.

According to the second embodiment, the coupling members 51 and 52 are provided for each large steel deck 15.

Figure 15:
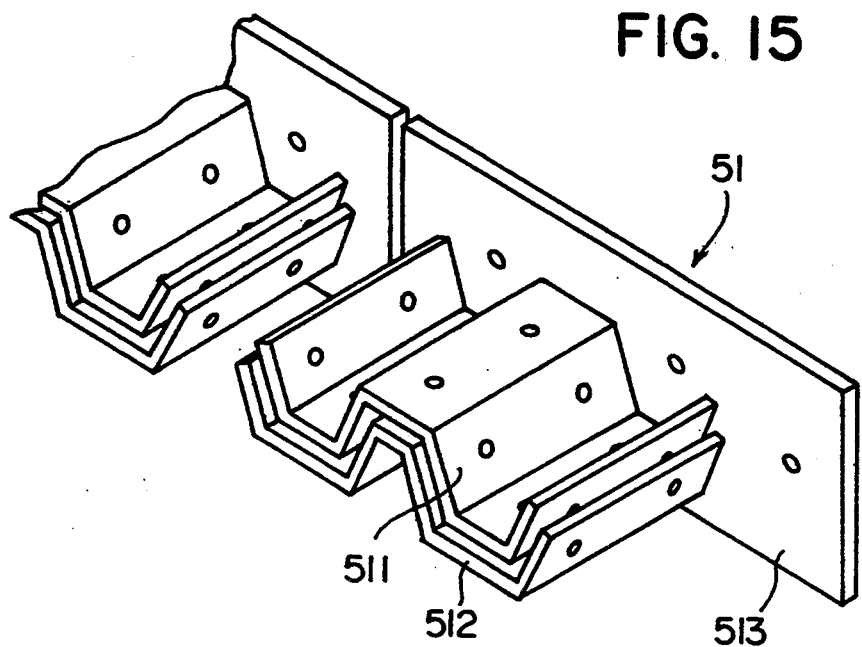
FIG. 15 is a partially perspective view illustrating the arched building structure of the second embodiment.

FIG. 15 is a perspective view showing the structure of the coupling member or joint 51 secured to the curved member 11.

Referring to this diagram, reference numerals 511 and 512 are corrugated plate members with a trapezoidal-wave cross section, which hold the large steel deck 15. Reference numeral 513 denotes a non-corrugated, flat plate member that supports the plate members 511 and 512. Each of the corrugated plate members 511 and 512 has a proximal end, which abuts the flat plate member 513, and a distal end and corrugations of trapezoidal shape extending between the two ends.

The plate members 511 and 512 are provided integral to the plate member 513 by means of, for example, welding, with a mutual distance or gap nearly equal to the thickness of the large steel deck 15.

Figure 16:
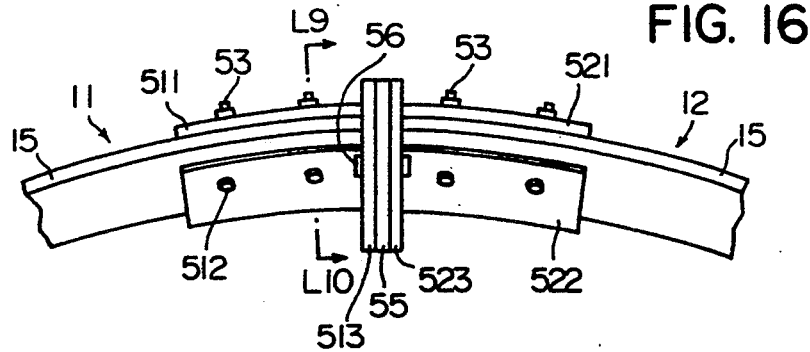
FIG. 16 is a partial front view illustrating the arched building structure of the second embodiment.

Though details are omitted, the coupling member or joint 52 also has corrugated plate members 521 and 522 for holding the large steel deck 15, and a non-corrugated, flat plate member 523 for supporting the plate members 521 and 522, as shown in FIG. 16.

Figure 17:
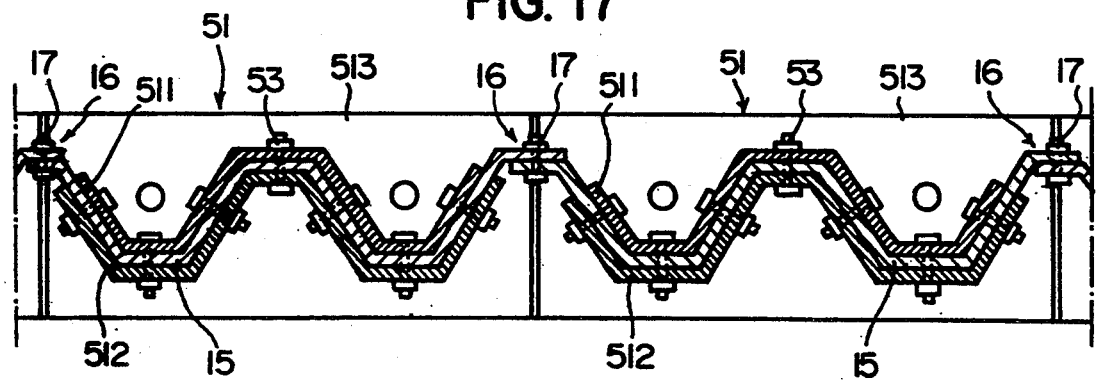
FIG. 17 is a cross section of the arched building structure taken along the line L9-L10 in FIG. 16, and as viewed in the arrow direction.

FIG. 16 is a front view illustrating the coupling or joint structure realized by the coupling members 51 and 52 as viewed from the gable side. FIG. 17 is a cross section taken along the line L9–L10 in FIG. 16, and as viewed in the arrow direction.

As illustrated, the large steel deck 15 is inserted between the plate members 511 and 512 of the coupling member 51, and are securely fastened to the deck 15 by bolts 53 or the like which extend through aligned openings in the opposed plate members 511, 512 and 521, 522.

Likewise, the coupling member 52 is secured to the large steel deck 15 on the side of the curved member 12.

Further, the plate members 513 and 523 are coupled together through a reinforced member 55 at multiple positions by bolts 56.

Accordingly, the curved members 11 and 12 are coupled together by the coupling members 51 and 52.

Now the support structure of the arched coupling body 10 will be discussed.

The description of the first embodiment has been given with reference to the still plates 20 and 21 integrally provided on the large steel deck 15.

According to the second embodiment, however, the still plates 20 and 21 are provided separate from the large steel deck 15. The still plates 20 and 21 are therefore provided with plate members 56 to 59 for securing the plates 20 and 21 to the large steel deck 15. The still plates 20, 21 and the plate members 56–59 constitute joints similar to those described above with reference to FIG. 15. FIG. 14 shows only the plate members 57 and 59.

As the plate members 56–59 have the same arrangement and the same shape as the holding portions 511, which have been described referring to FIG. 15, their detailed description will be omitted hereunder.

Figure 18:
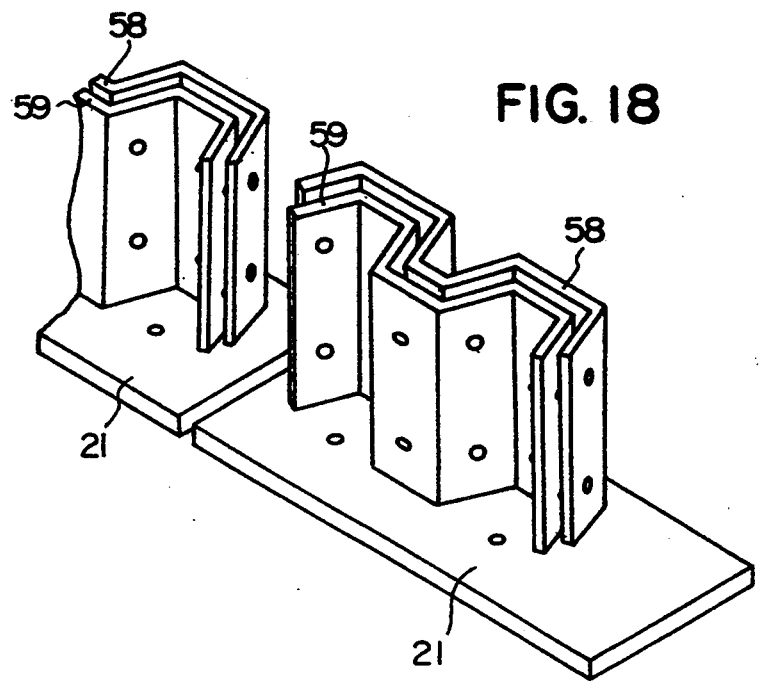
FIG. 18 is a partial perspective view of the arched building structure of the second embodiment.

FIG. 18 illustrates the outline of the plate members 58 and 59 provided on the still plate 21.

The plate members 58 and 59 are integrally provided on the still plate 21 by welding, for example.

FIG. 14 shows a case where the stills 22 and 23 are made of steel H- or I-beams.

It is to be noted that this embodiment can produce the same effects as the first embodiment, and can ensure higher transporting efficiency for the curved members 11 and 12 than the first embodiment. This is because the still plates 20 and 21 are also detachable from the large steel deck 15.

Figure 19:
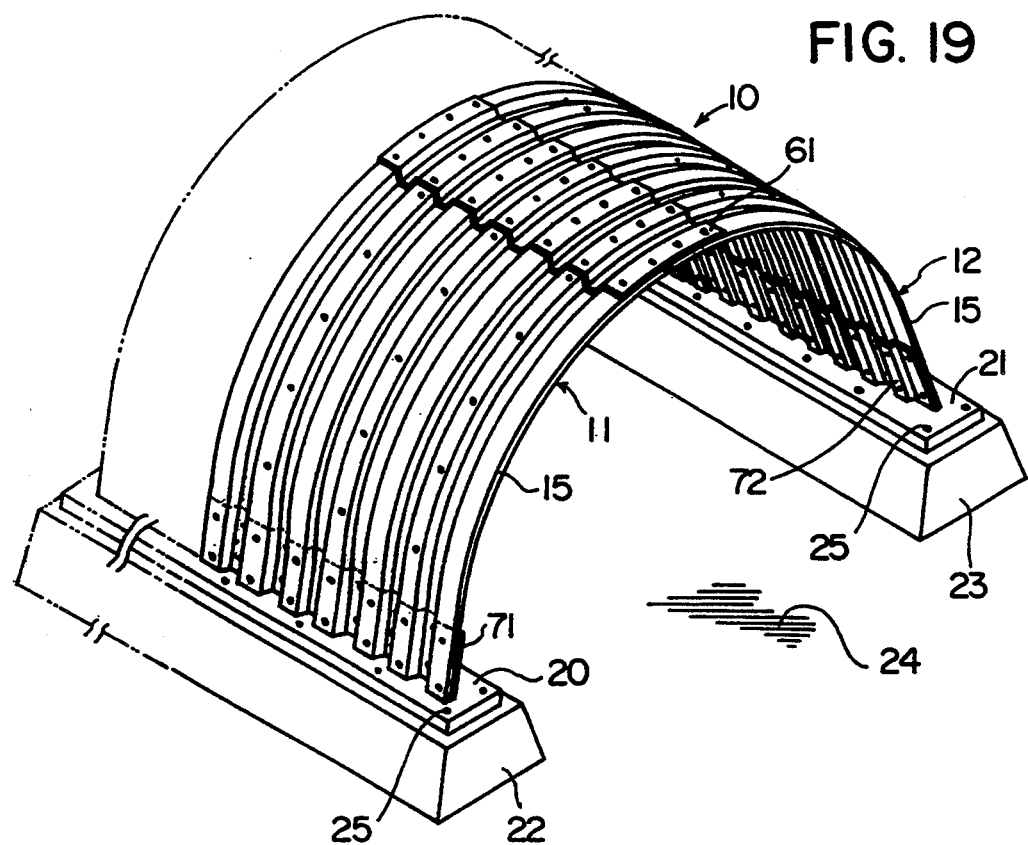
FIG. 19 is a perspective view illustrating the outline of an arched building structure according to a third embodiment of the present invention.

FIG. 19 is a perspective view illustrating the outline of an arched building structure according to the third embodiment of the present invention. Likewise, FIG. 20 is a front view as viewed from the gable side.

Figure 20:
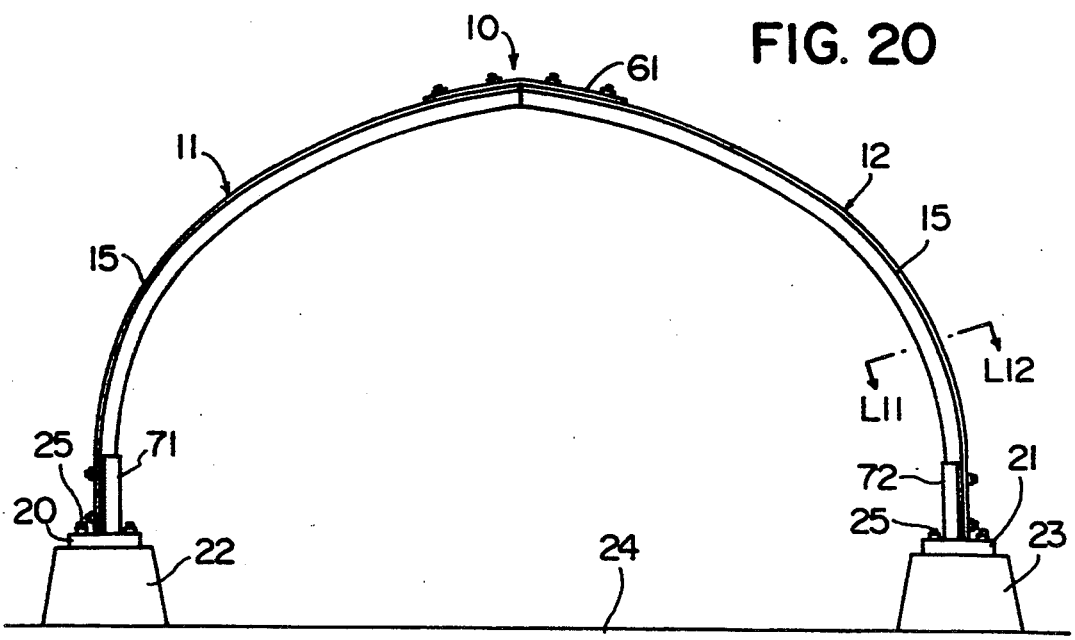
FIG. 20 is a front view illustrating the arched building structure of the first embodiment as viewed from the gable side.

In FIGS. 19 and 20, the same reference numerals as used to denote the individual portions in FIG. 1 are used to denote corresponding or identical portions.

With regard to the coupling structure of the curved members 11 and 12, the third embodiment is an improvement of the coupling structures of the first and second embodiments. The support structure of the arched coupling body 10 is an improvement of the support structure of the second embodiment.

First, the coupling structure of the curved structural members 11 and 12 will be described below.

According to the first and second embodiments, the curved members 11 and 12 are coupled on the outer surface as well as the inner surface. According to the third embodiment, however, the curved members 11 and 12 are coupled on either the outer surface or inner surface thereof.

In FIGS. 19 and 20, reference numeral 61 is a plate member for coupling the curved members 11 and 12 in end-to-end axial alignment.

Figure 21:
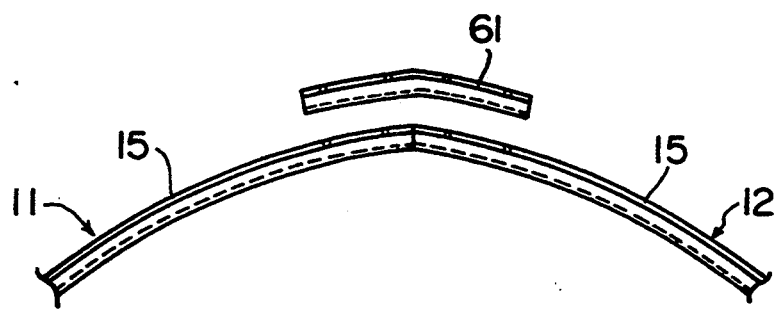
FIG. 21 is a partially front view illustrating the arched building structure of the third embodiment as viewed from the gable side.
Figure 22:
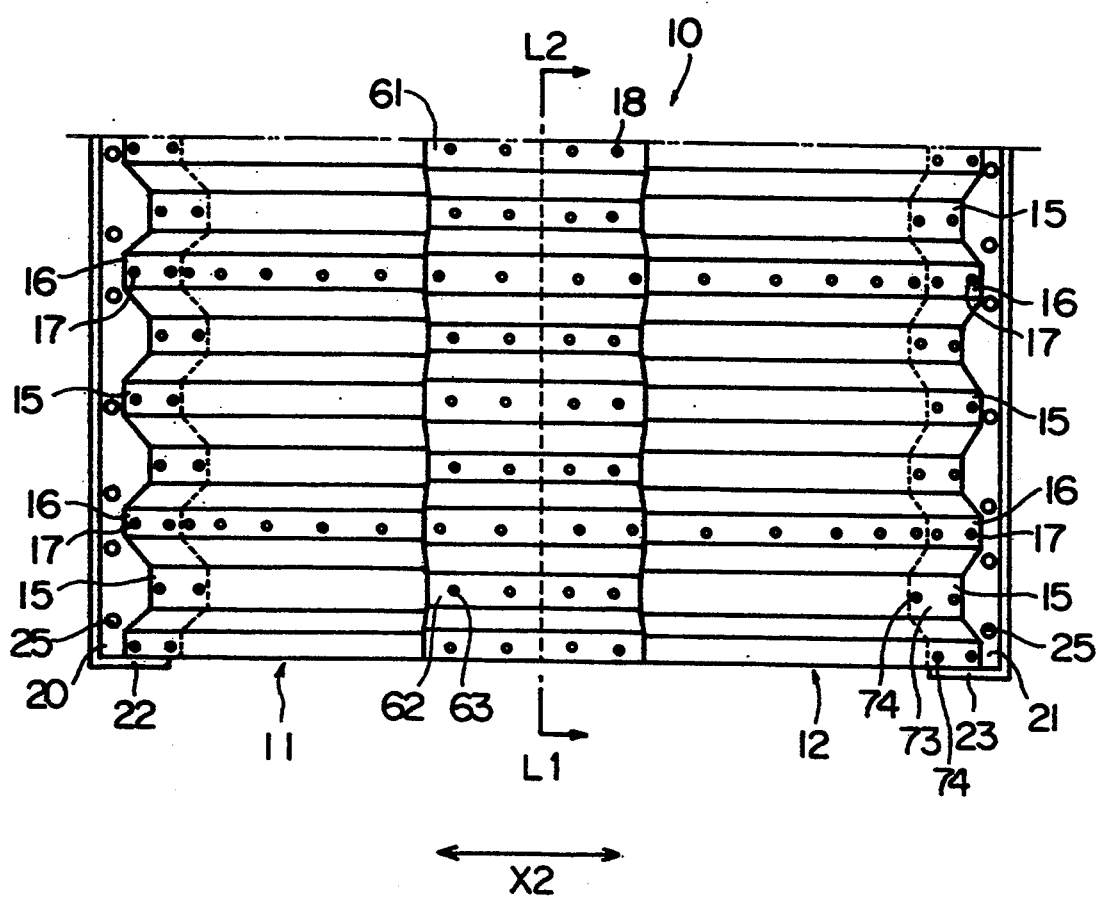
FIG. 22 is a top plan view of the arched building structure of the third embodiment.

FIG. 21 is a front view illustrating the plate member 61 separated from the curved members 11 and 12 as viewed from the gable side. FIG. 22 is a top plan view of the plate member 61 attached to the curved members 11 and 12. FIG. 23 is a cross section taken along the line L1–L2 in FIG. 22, as viewed in the arrow direction.

As shown in FIGS. 22 and 23, like the plate member 13 in the first embodiment, the plate member 61 is formed to have a trapezoidal-wave cross section. The width of this plate member 61 in the wave direction X1 is however set to substantially equal the width of the large steel deck 15 in the wave direction X1.

With this structure, the plate member 61 is disposed to overlap the adjoining plate member 61 at the end in the wave direction X1 as shown in FIG. 23.

The plate member 61 is secured to the large steel deck 15 by bolts 63 at an overlapping portion 62 according to this arrangement. This overlapping portion 62 is set to be shifted in the wave direction X1 from the overlapping portion 16 of the large steel deck 15. In other words, the plate member 61 is so disposed as to lie over two adjoining steel deck 15 through the overlapping portion 16.

This structure prevents the two steel decks 15 from overlapping two plate members 61 at the same point.

Next, the support structure of the arched coupling body 10 will be described.

According to the second embodiment, the plate members 56–59 for fixing the arched coupling body 10 to the still plates 21 and 22 are provided on the outer surface and the inner surface of the arched coupling body 10. According to this embodiment, by way of contrast, plate members 71 and 72 corresponding to the plate members 56–59, are provided only on the outer surface or the inner surface of the arched coupling body 10.

FIGS. 19 and 20 illustrate the plate members 71 and 72 provided only on the inner surface of the arched coupling body 10.

FIG. 24 is a cross section of the curved member 12 taken along the line L11–L12 in FIG. 20, as viewed in the arrow direction.

As illustrated, the coupling structure to couple the plate member 72 to the large steel deck 15 of the curved member 12 is the same as the one to connect the plate member 16 to the large steel deck 15 as apparent from comparison with FIG. 23.

More specifically, the plate member 72 has a width substantially equal to that of the large steel deck 15 in the wave direction X1, and is designed to overlap the adjoining plate member 72. At an overlapping portion 73, the plate members 72 are fastened by bolts 94, for example.

In this case, the position of the overlapping portion 73 is spaced away from the overlapping portion 16, and is so set to prevent the two plate members 72 and two large steel decks 15 from overlapping each other at the same point.

According to this embodiment, the still plate 21 is formed by a single plate extending over the entire surface of the curved member 12, not a separate plate for each large steel deck 15.

Though not shown in detail, the still plate 20 and the plate member 71 have the same structure as the still plate 21 and the plate member 72, respectively.

As described in detail above, the number of plate members to couple the curved members 11 and 12 can be reduced as compared with the first embodiment, because the plate member 61 is provided only on the outer surface of the curved members 11 and 12.

Although this embodiment has plate member 61 provided only on the outer surface of the curved members 11 and 12, it can ensure substantially the same mechanical strength as the one obtained by the first embodiment. This is because coupling adjacent plate members 61 provides continuous mechanical strength.

Although adjoining plate members 61 are coupled according to this embodiment, it is possible to prevent two plate members 61 and two large steel decks 15 from overlapping each other. This is because the overlapping portions 64 are separated from the overlapping portions 16 of the two plate members 61.

Figure 25:
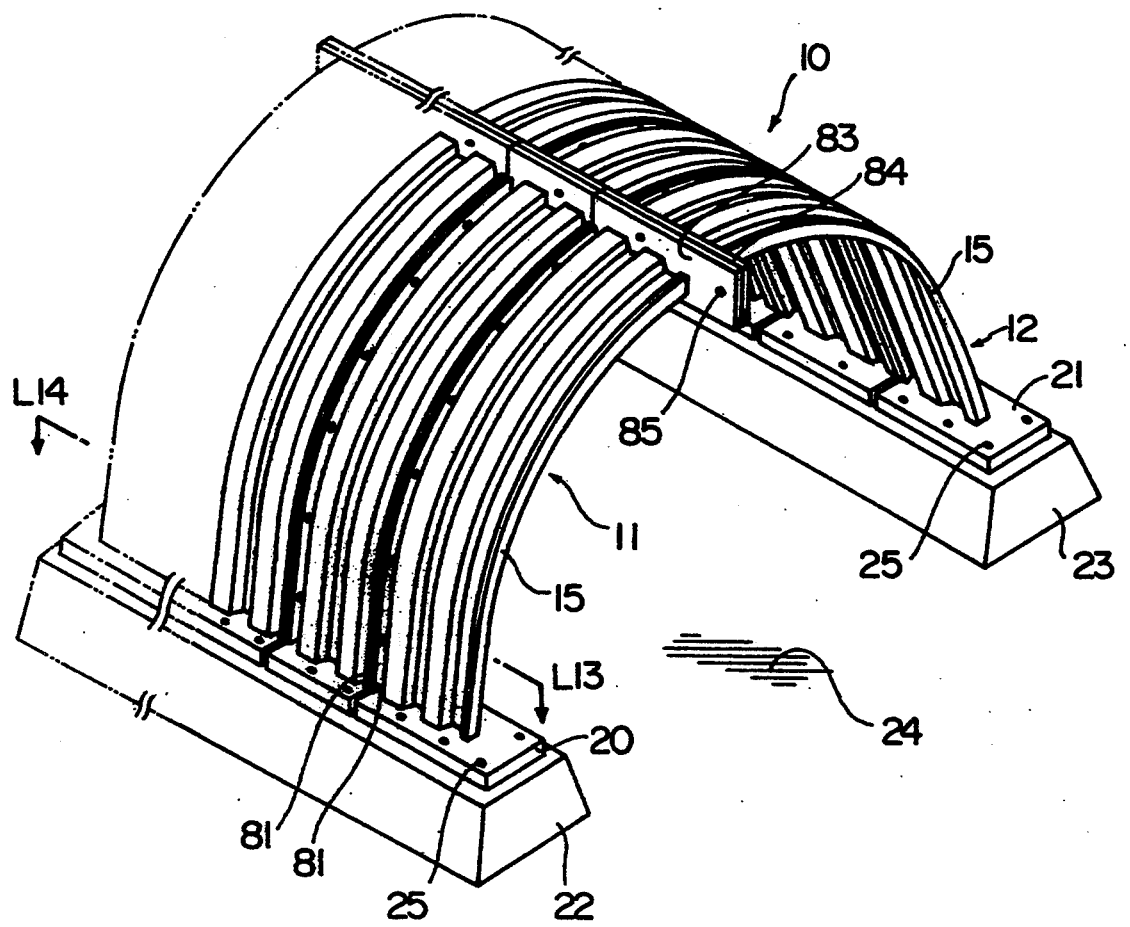
FIG. 25 is a perspective view illustrating the outline of an arched building structure according to a fourth embodiment of the present invention.

FIG. 25 is a perspective view illustrating the outline of an arched building structure according to the fourth embodiment of the present invention.

The description of the first to third embodiments has been given with reference to the case where multiple large steel decks 15 are disposed to overlap one another in the wave direction X1, and adjoining large steel decks 15 are coupled together at the overlapping portion 16.

According to the fourth embodiment, the adjoining large steel decks 15 are coupled by flanges 81. This is shown in FIG. 26.

FIG. 26 is a cross section taken along the line L13–L14 in FIG. 25, as viewed in the arrow direction.

Referring to this diagram, the coupling flange 81 is formed by bending one end of each large steel deck perpendicular to the wave direction X1, toward the outer surface of the curved structural members 11 and 12.

As the position where the bending takes place, the aforementioned overlapping portion 16 in, for example, FIG. 4 is selected. This feature can set the effective width of the large steel deck 15 to the same one involved in the first embodiment.

The thus formed flange 81 is coupled to the adjoining flange 81 by a bolt 82, thereby permitting the curved members 11 and 12 to have continuous mechanical strength in the wave direction X1.

According to the fourth embodiment, the coupling structure for two curved members 11 and 12 is such that flanges 83 and 84 integrally provided by welding or the like are fastened to the individual large steel decks 15 by bolts 85.

As described in detail above, this embodiment can permit work of coupling the large steel decks 15 only on the outer surface side of the curved members 11 and 12, thus facilitating the coupling work.

Further, the flange 81 is formed by bending work done on the large steel deck 15, eliminating the need to weld the flange 81.

The flange 81 may be formed on the inner surface side of the curved members 11 and 12 as shown in FIG. 27.

In this case, the coupling work for the large steel deck 15 can be executed only on the inner surface side of the curved members 11 and 12.

Figure 28:
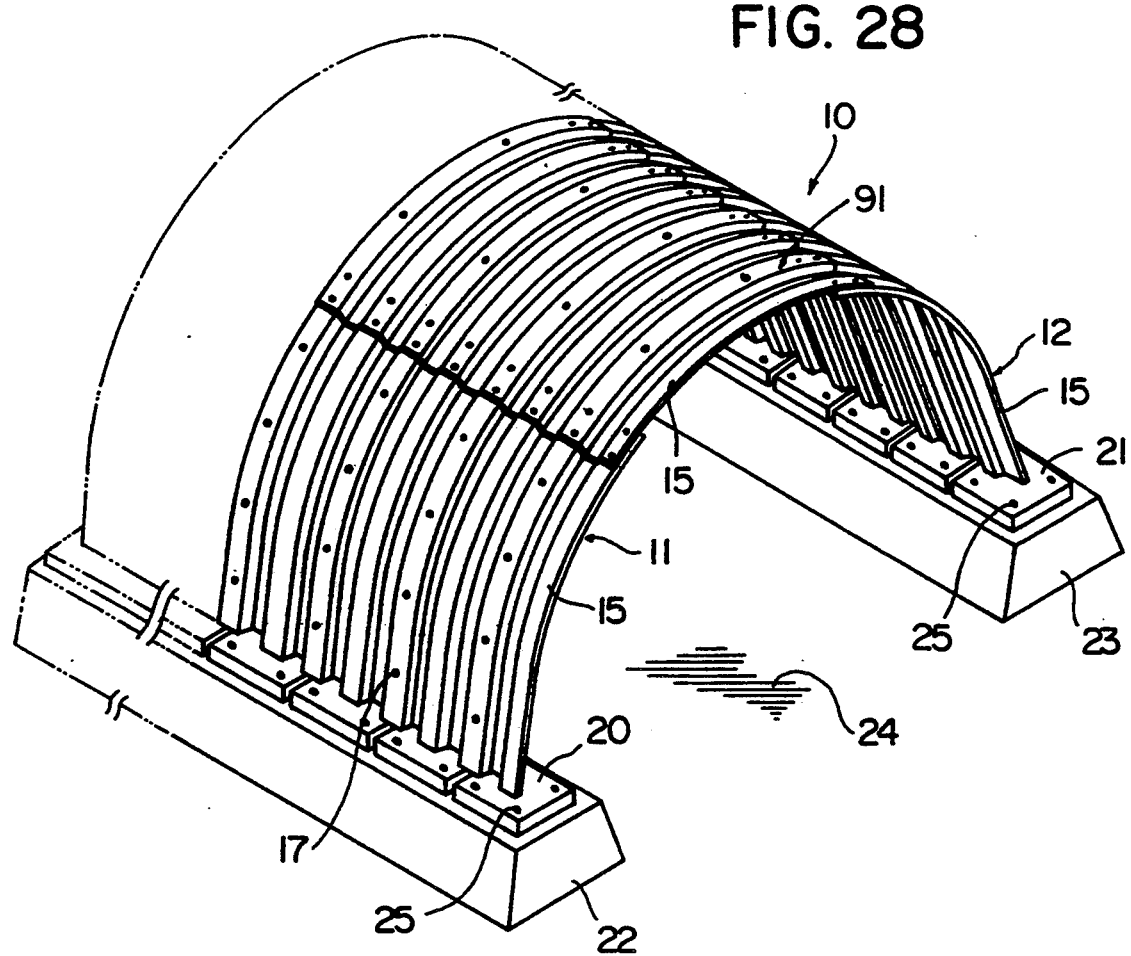
FIG. 28 is a perspective view of the outline of an arched building structure of a fifth embodiment according to the present invention.
Figure 29:
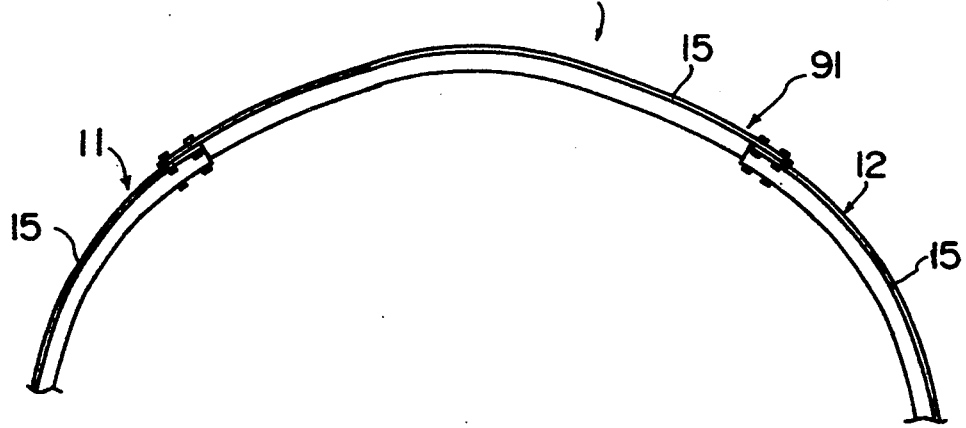
FIG. 29 is a partially front view illustrating the arched building structure of a fifth embodiment as viewed from the gable side.

FIG. 28 is a perspective view of the outline of an arched building structure of the fifth embodiment according to the present invention. FIG. 29 is a front view of the same structure as viewed from the gable side.

Like reference numerals used to denote individual elements of the embodiment shown in FIG. 1 are also used to specify corresponding or identical elements in FIG. 28 to thereby avoid an otherwise redundant description.

According to the first to fourth embodiments, two curved members 11 and 12 are to be coupled in end-to-end axial alignment to form the arched coupling body 10. According to the fifth embodiment, by way of contrast, three curved members 11, 12 and 91 are to be coupled in end-to-end axial alignment to form the arched coupling body 10.

Figure 30:
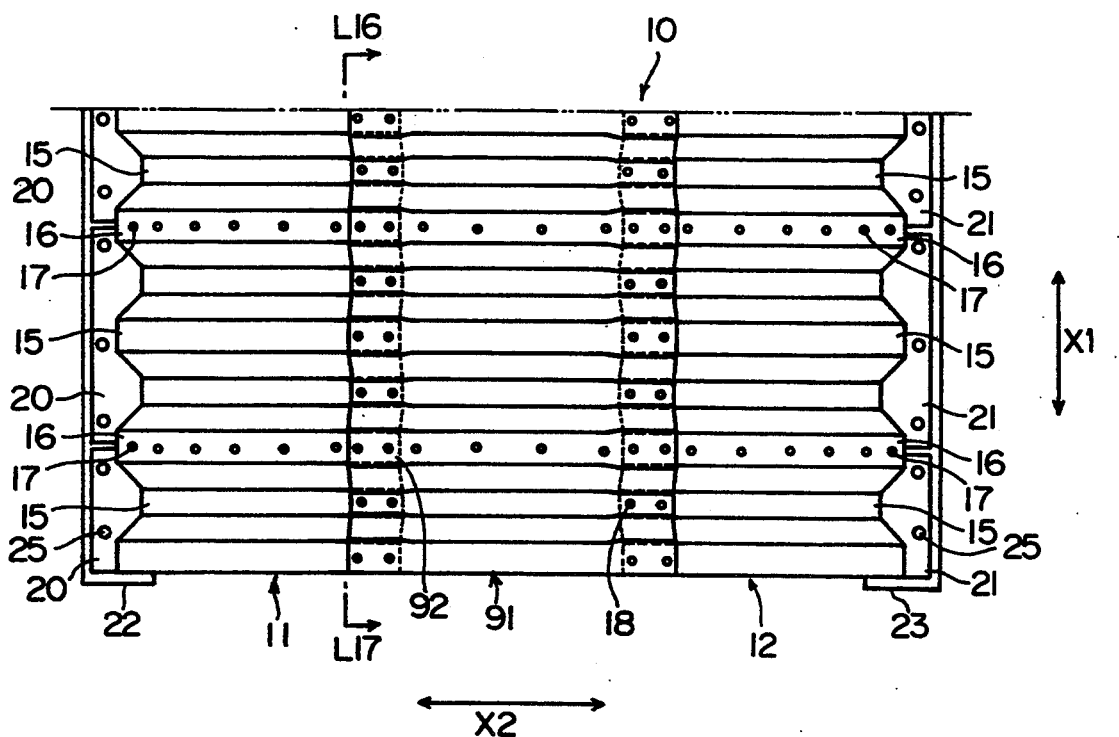
FIG. 30 is a top plan view illustrating the arched building structure of the fifth embodiment.

FIG. 30 is a top plan view of the arched building structure in FIG. 29.

As illustrated, a curved structural member 91 is disposed to lie over the curved members 11 and 12 to connect these curved members 11 and 12. Therefore, that portion of the curved member 91 which overlaps the curved members 11 and 12 is pressed to fit over the curved members 11 and 12. In this manner, the intermediate curve member 91 couples together the curved members 11 and 12 and constitutes an axial extension thereof.

Figure 31:
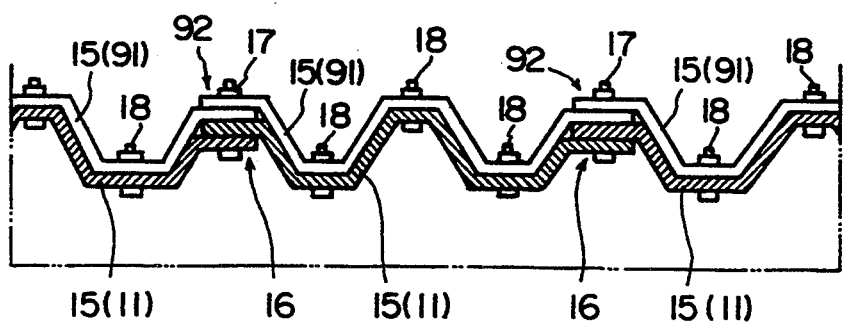
FIG. 31 is a cross section of the arched building structure taken along the line L15-L16 in FIG. 30, and as viewed in the arrow direction.

FIG. 31 is a cross section taken along the line L15–L16 in FIG. 30, and as viewed in the arrow direction. FIG. 31 illustrates the case where the overlapping portion 16 of the large steel deck 15 constituting the curved member 11 overlaps an overlapping portion 92 of the large steel deck 15 constituting the curved member 91.

Of course, the overlapping portions 16 and 92 may be deviated from each other.

The above structural feature can reduce the number of overlapped large steel decks 15 to three at a maximum, thus ensuring easy coupling of the large steel decks 15.

This embodiment can also produce the same effects as the first embodiment, but can provide an arched building structure with a greater span than the first embodiment.

Figure 32:
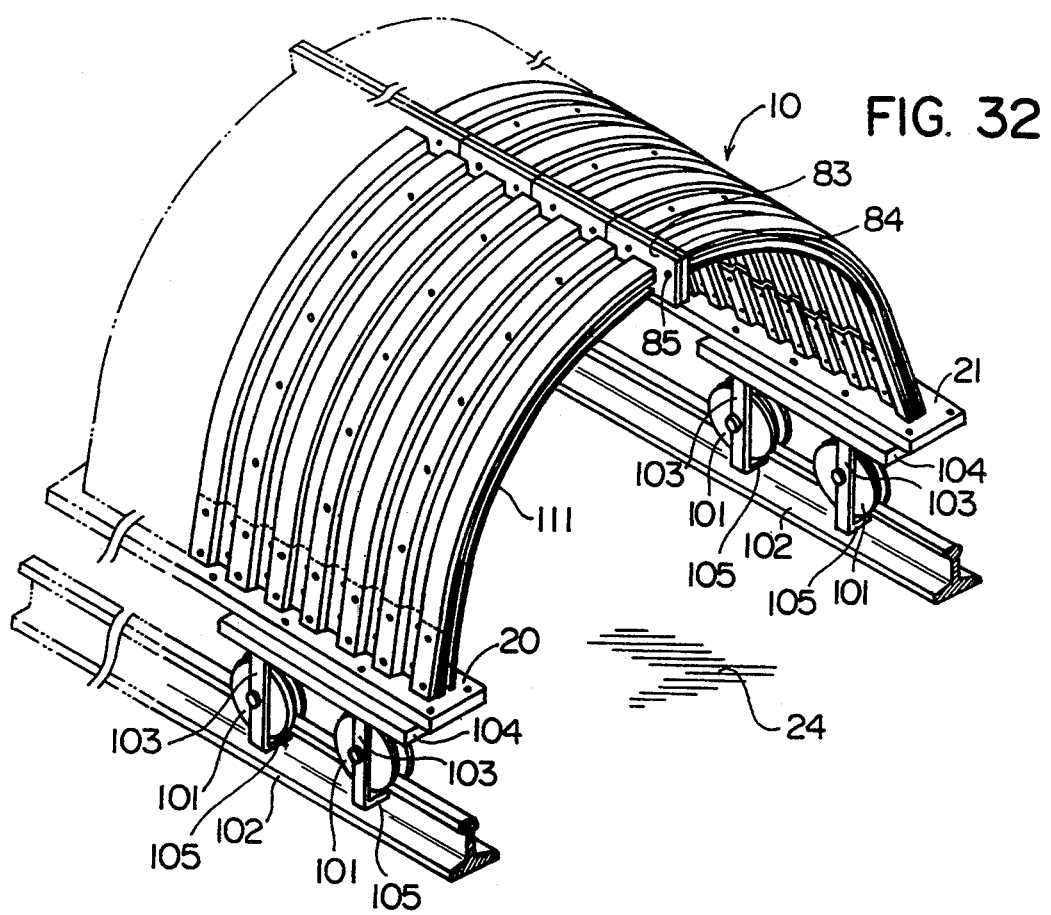
FIG. 32 is a perspective view illustrating the outline of an arched building structure according to a sixth embodiment of the present invention.
Figure 33:
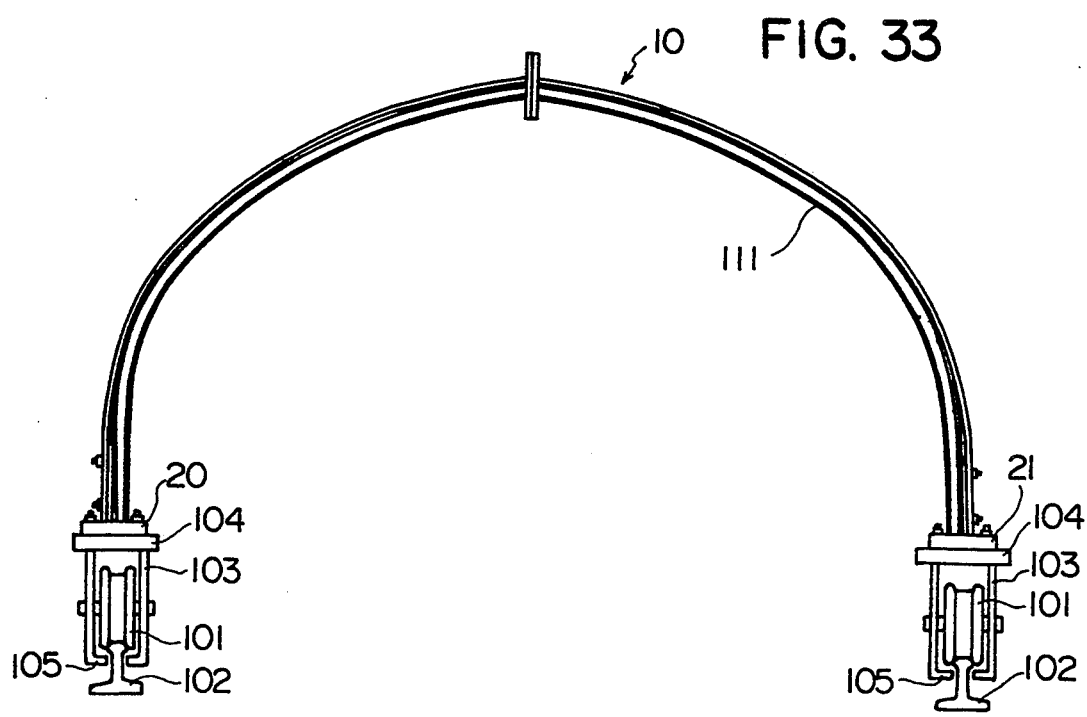
FIG. 33 is a front view illustrating the arched building structure of the sixth embodiment as viewed from the gable side.

FIG. 32 is a perspective view illustrating the outline of an arched building structure according to the sixth embodiment of the present invention. FIG. 33 is a front view of the arched building structure as viewed from the gable side.

While the first to fifth embodiments have been described with reference to the arched coupling body 10 secured on the ground, the seventh embodiment supports the arched coupling body 10 movable on the ground.

FIGS. 32 and 33 illustrate the case where a moving mechanism comprising a wheel 101 and a rail 102 moves the arched coupling body 10.

The wheel 101 is attached through a wheel holder 203 and a wheel receiver 104 to the bottom of each still plate 20 (or 21).

The wheel holder 103 is provided with an engaging portion 105 to prevent the wheel 101 from coming off the rail 102. Even if a wind blows against the arched coupling body 10, the wheel 101 stays on the rail 102.

Figure 34:
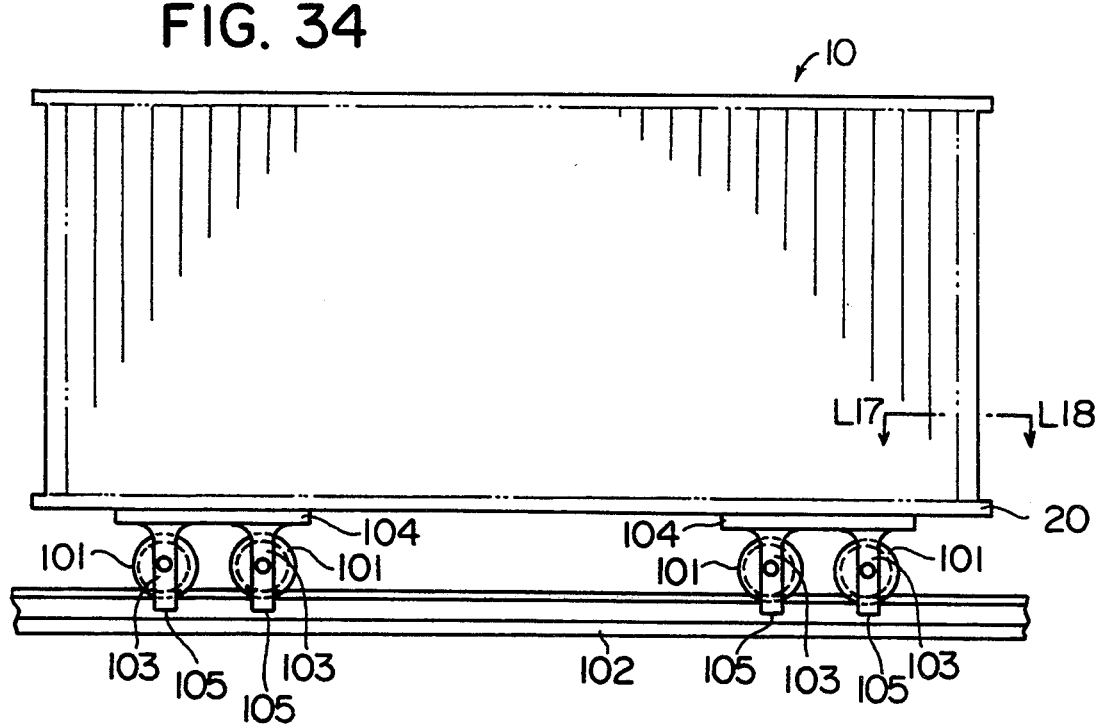
FIG. 34 is a side view illustrating the arched building structure of the sixth embodiment.

The still plate 20 (or 21) is constituted by a single plate over the whole curved member 11 (or curved member 12). This is because the wheel 101 is disposed only at the end of the arched coupling body 10 in the depth direction, as shown in FIG. 34.

Even if the still plate 20 (or 21) is provided for each large steel deck 15, no problems would arise by securing every still plate 20 (or 21) to a reinforced plate, then attaching the wheel receiver 104 to the reinforced plate.

Figure 35:
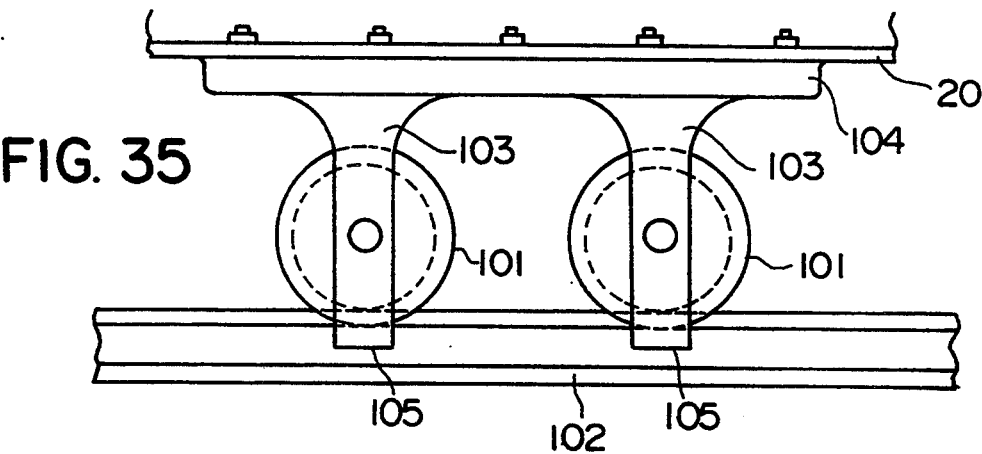
FIG. 35 is a side view illustrating a wheel mechanism of the arched building structure of the sixth embodiment.
Figure 36:
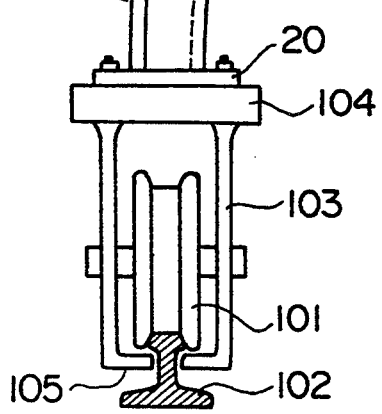
FIG. 36 is a front view illustrating the wheel mechanism of the arched building structure of the sixth embodiment.

FIG. 35 is a side view of a moving mechanism, and FIG. 36 a front view of the same.

With this structure, the arched coupling body 10 can be moved by pushing or pulling the coupling body 10.

In this case, however, large force may be applied to the arched coupling body 10. The end portion of the arched coupling body in the depth direction may be reinforced by an H- or I-shaped steel 11 as shown in FIGS. 32 and 33.

Figure 37:
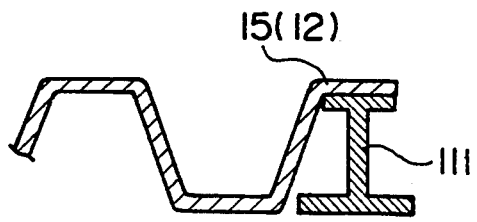
FIG. 37 is a cross section of the arched building structure taken along the line L17-L18 in FIG. 34.

FIG. 37, illustrating this state, is a cross section taken along the line L17–L18 in FIG. 34 and as viewed from the arrow direction.

According to the above-described embodiment, one can perform outdoor work, such as a painting job or placing concrete into the ground, which conventionally needs to be stopped or interrupted during raining or snowing. This is because the worker can do the outdoor work while being sheltered inside the arched building structure while moving this structure.

Figure 38:
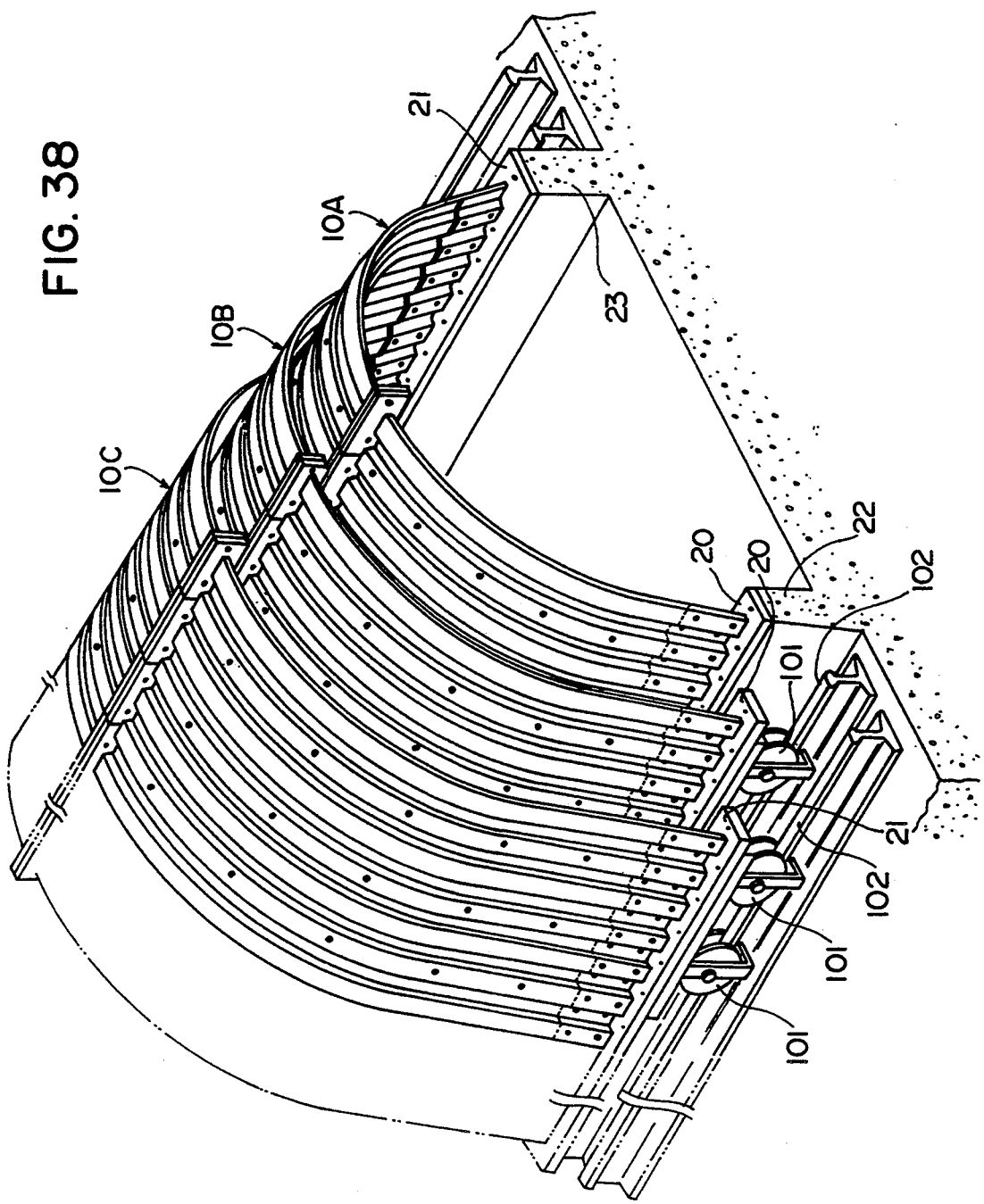
FIG. 38 is a perspective view illustrating the outline of an arched building structure according to a seventh embodiment.
Figure 40:
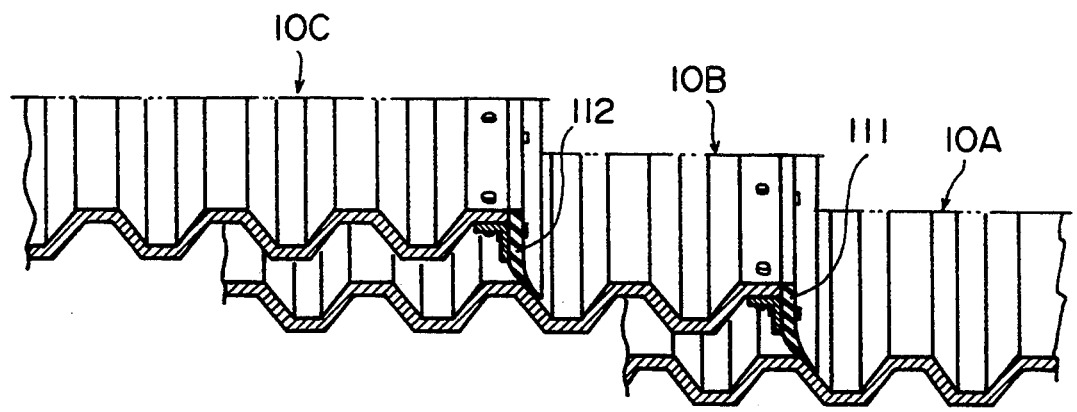
FIG. 40 is a cross section of the arched building structure taken along the line L19-L20 in FIG. 39.

FIG. 38 is a perspective view illustrating the outline of an arched building structure according to the seventh embodiment. FIG. 40 is a front view of the same as viewed from the gable side.

According to this embodiment, a plurality of arched coupling bodies 10 of different spans are arranged coaxially, and their mutual position is changeable.

Figure 39:
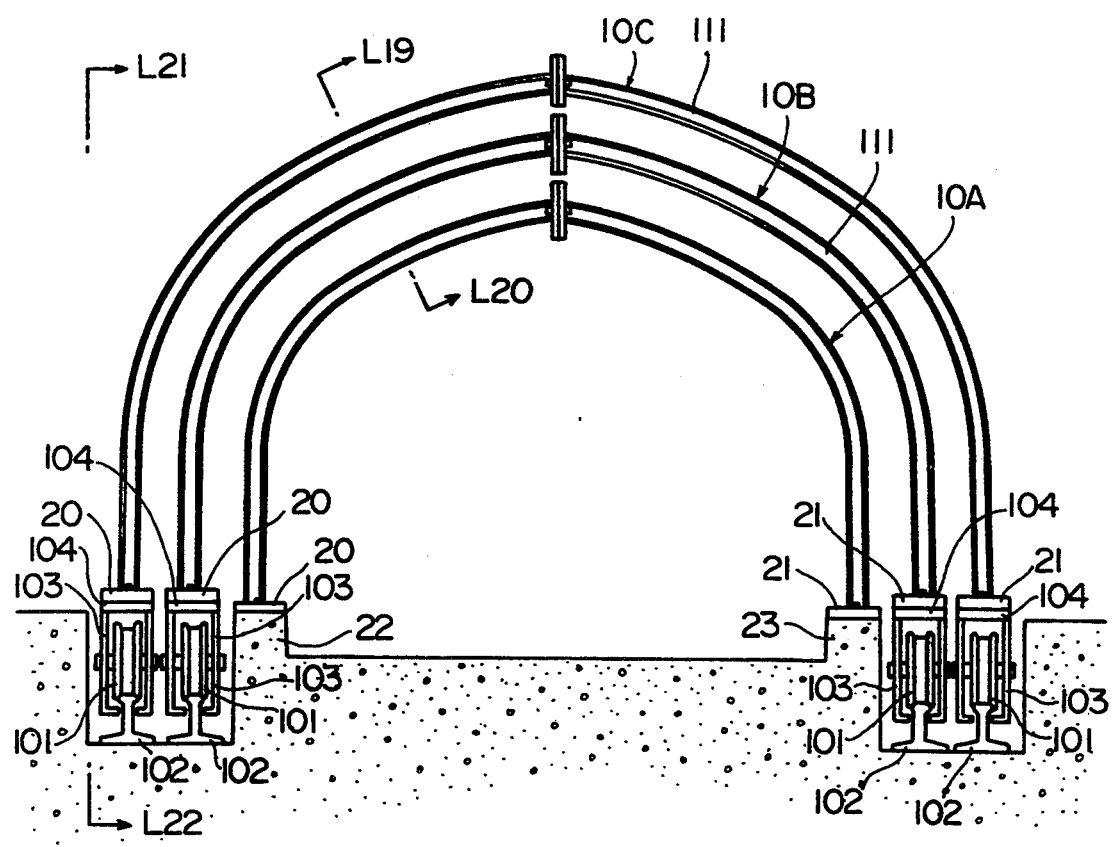
FIG. 39 is a front view illustrating the arched building structure of the seventh embodiment from the gable side.

FIG. 39 illustrates the arched coupling bodies 10A to 10C provided coaxially. The arched coupling body 10A of the shortest span is secured on the ground through the still plates 20 and 21 and the stills 22 and 23, whereas the remaining arched coupling bodies 10B and 10C are provided with a moving mechanism comprising the wheel 101 and rail 102 as per the sixth embodiment.

With the above structure, as shown in FIG. 39, moving the arched coupling bodies 10B and 10C can alter the depth of the arched building structure.

The ends of the arched coupling bodies 10B and 10C are provided with rubber seals 111 and 112 for respectively sealing the gap between the bodies 10B and 10A and the gap between the bodies 10C and 10B.

FIG. 40 is a cross section of the arched building structure in FIG. 39 taken along the line L19–L20 and as viewed from the arrow direction.

Figure 41:
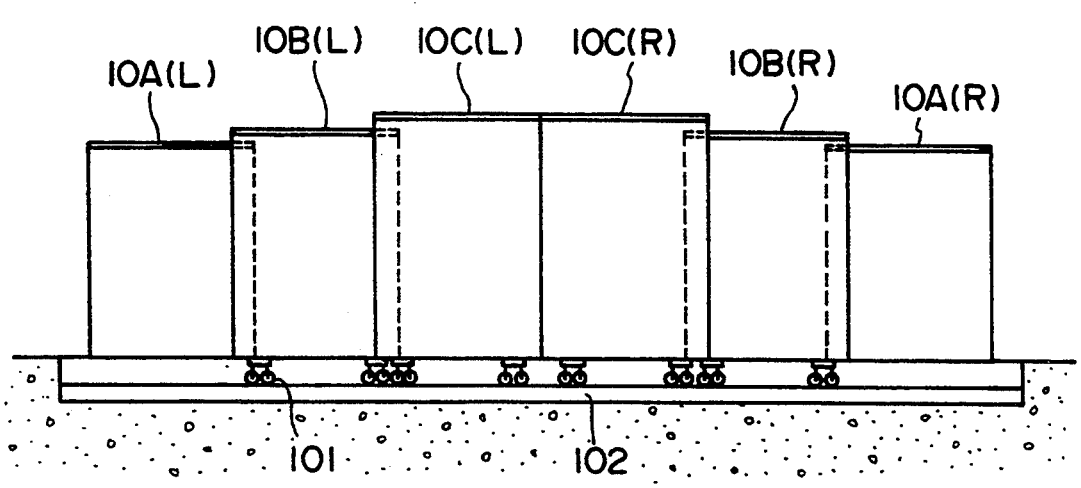
FIG. 41 is a side view illustrating a modification of the arched building structure of the sixth embodiment.
Figure 42:
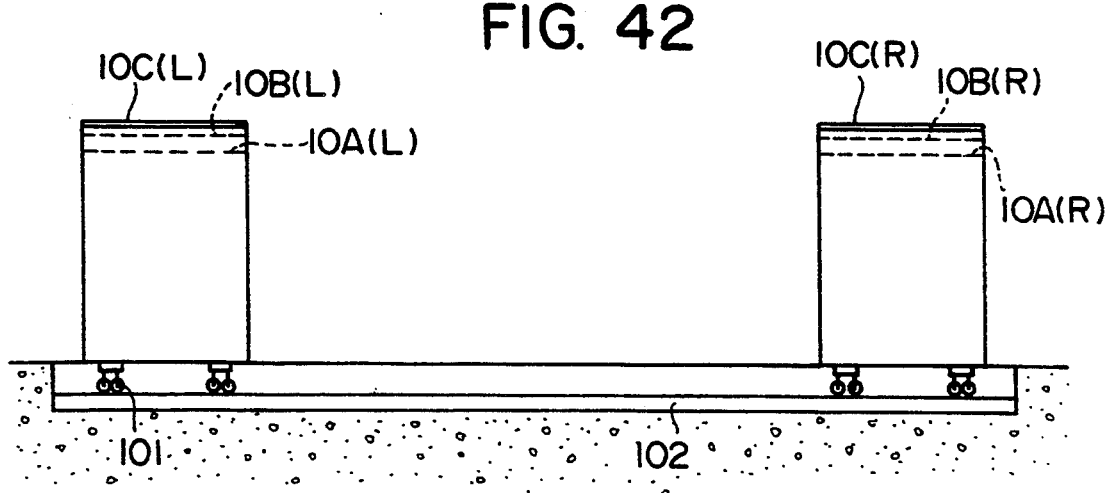
FIG. 42 is a side view illustrating the state of opening the arched building structure in FIG. 41.
Figure 43:
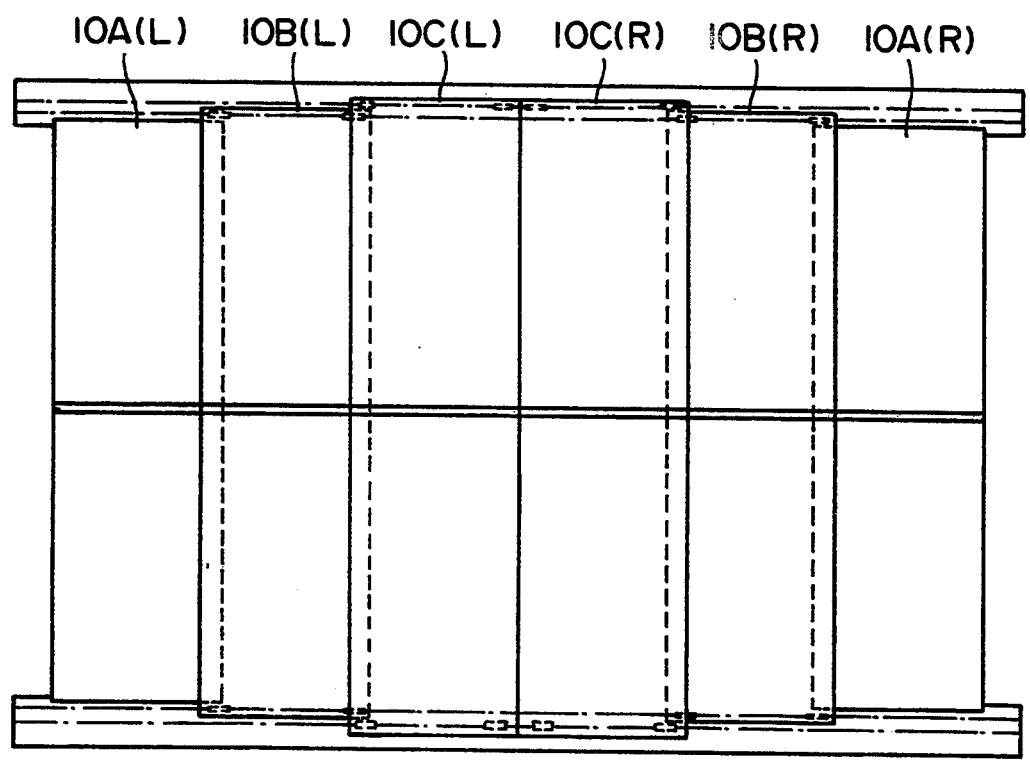
FIG. 43 is a plan view of the modification of the sixth embodiment.

FIGS. 41 to 43 are side views illustrating the structure in FIG. 39 taken along the line L21–L22 and as viewed from the arrow direction. FIG. 44 is a top plan view of FIG. 40.

The illustrated example has a pair of the structures left and right facing each other. In this case, the arched coupling body 10A(L) on the left side (L), which is fixed, and the arched coupling body 10A(R) on the right side (R) are arranged with a predetermined interval therebetween. The space between the two arched coupling bodies 10A(L) and 10A(R) is closed or open by the movable left arched coupling bodies 10B(L) and 10C(L) on the left side, and the arched coupling bodies 10B(R) and 10C(R).

FIG. 41 is a side view of the closed state, while FIG. 42 is a side view of the open state.

The above structure permits one to close the arched coupling bodies as shown in FIGS. 41 and 43 when it rains or snows, and to open it as shown in FIG. 42 when it is fine day. In this manner, outdoor work can be done without being influenced by the actual weather.

Further, this design can increase the depth of the arched coupling body, and can freely change the depth.

Although several embodiments of the present invention have been described above, this invention is not restricted to these particular embodiments.

(1) For instance, according to the first embodiment, the width of the plate members 13 and 14 in the wave direction X1 is set smaller than the width of the large steel deck 15 in the direction X1. The former width may be set equal to or greater than the latter width.

(2) According to the second embodiment, the plate members 511 and 512 are provided on the outer surface and inner surface of the curved members 11 and 12. These plate members 511 and 512 may however be provided either on the outer surface or inner surface of the curved members 11 and 12.

(3) According to the third embodiment, the width of the plate member 61 in the wave direction X1 is set nearly equal to the width of the large steel deck 15 in this direction. The former width may be set greater or smaller than the latter.

(4) In the description of the sixth embodiment, a wheel mechanism comprises a wheel and a rail as moving means. According to this invention, however, the moving means may comprises only a wheel. Alternatively, a slide type, a turn type or a caster type moving means may also be used.

(5) Although the foregoing description has been given with reference to the case of two or three curved members coupled together, four curved members or greater may be coupled instead.

In this case, increasing the number of coupled curved members can provide an arched building structure with a large span.

(6) While the inner arched coupling body 10A is secured on the ground in the seventh embodiment, the other arched coupling body 10B or 10C may be fixed to the ground.

(7) Although, according to the seventh embodiment, two of the three arched coupling bodies are designed movable, one or all of the three arched coupling bodies may be designed movable.

(8) Although, according to the seventh embodiment, three arched coupling bodies are provided, two or four or more arched coupling bodies may be provide.

(9) In addition, a flange system is used as a way to couple the curved members in the seventh embodiment. This embodiment may however employ the coupling system as shown in FIG. 1, 14, 19 or 28.

(10) While the foregoing description has been given with reference to the curved members formed by multiple large steel decks 15, the curved members may be formed by a single large steel deck 15. The latter structure can be applied to the case of constructing an arched gate or the like.

(11) Further, the above description has been given with reference to the case where the large steel deck 15 is used as a large corrugated plate having a large section modulus.

According to the present invention, however, a corrugated plate having a large section modulus, such as a steel deck or keystone plate, may be used. The "steel deck" is a plate having the peak height of 50 to 75 mm. The "keystone plate" is a plate having a peak height 25 mm.

These corrugated plates have a significant section modulus though it is a smaller than that of the large steel deck. Depending on the span of the arched coupling body 10, therefore, it is possible to acquire the same mechanical strength as obtained when the large steel deck 15 is used.

At present, the above-described corrugated plate is often formed of iron. This invention can however be applied to corrugated plates formed of aluminum or stainless steel besides iron.

(12) Although the foregoing description has been given with reference to the case where when two curved members are coupled, the coupling portions of the two curved members (top of the arched coupling body) are formed in a mountain shape as shown in FIG. 2, the curved members may be coupled with roundness.

(13) In the above description, the plate members (e.g., plate members 13 and 14) to be placed on the curved members are formed to have a wave shape. According to this invention, however, the plate members may be formed flat.

The present invention may be modified in various other forms without departing from the scope and spirit of the invention.

What is claimed is:

1. A joint assembly comprising: two non-corrugated plate members each having opposed front and back surfaces, the two plate members being connected in back-to-back relation; and at least one corrugated plate member connected to and extending outwardly from the front surface of said each non-corrugated plate member, each corrugated plate member having proximal and distal ends with corrugations extending therebetween, and said each corrugated plate member having its proximal end abutting the front surface of the non-corrugated plate member to which it is connected.

2. A joint assembly according to claim 1; including a reinforcing member sandwiched between the back surfaces of the two plate members.

3. A joint assembly according to claim 1; including another corrugated plate member connected to and extending outwardly from the front surface of said each non-corrugated plate member, the two corrugated plate members which are connected to said each non-corrugated plate member having similarly shaped corrugations and lying in opposed, confronting relation with a predetermined gap therebetween.

4. A joint assembly according to claim 3; wherein the two opposed corrugated plate members which are connected to said each non-corrugated plate member have sets of aligned openings therethrough for receiving fastening members.

5. A joint assembly according to claim 1; wherein the corrugations of said each corrugated plate member extend in side-by-side relation in a straight line.

6. A joint assembly according to claim 1; wherein the front and back surfaces of said each non-corrugated plate member are flat and non-corrugated.

7. A joint assembly according to claim 1; including means for permanently connecting said each corrugated plate member to its respective non-corrugated plate member.

8. A joint assembly according to claim 7; wherein the means for permanently connecting comprises a welded connection.

9. A joint assembly according to claim 1; wherein the corrugations have a trapezoidal cross section.

* * * * *